United States Patent
Oh et al.

(10) Patent No.: US 9,647,554 B1
(45) Date of Patent: May 9, 2017

(54) SINGLE INDUCTOR MULTI-OUTPUT DC-DC CONVERTER AND OPERATING METHOD THEREOF

(71) Applicant: Electronics and Telecommunications Research Institute, Daejeon (KR)

(72) Inventors: Jimin Oh, Daejeon (KR); Jung Hee Suk, Daejeon (KR); Yil Suk Yang, Daejeon (KR); Sang Kyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/223,510

(22) Filed: Jul. 29, 2016

(30) Foreign Application Priority Data

Jan. 11, 2016 (KR) .......................... 10-2016-0003295

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ... H02M 2001/009; H02M 2001/0093; H02M 3/156; H02M 3/1588
See application file for complete search history.

(56) References Cited

U.S. PATENT DOCUMENTS

| 7,061,214 B2* | 6/2006 | Mayega ................ H02M 3/156 323/267 |
| 7,132,765 B2* | 11/2006 | Premont ............... H02M 3/157 307/80 |
| 8,427,121 B2* | 4/2013 | Notman .............. H02M 3/1588 323/267 |
| 8,624,429 B2 | 1/2014 | Jing et al. |
| 8,884,593 B2* | 11/2014 | Su ......................... H02M 3/158 323/225 |
| 9,007,039 B2* | 4/2015 | Kim ..................... H02M 3/158 323/267 |
| 9,203,310 B2 | 12/2015 | Huang et al. |

(Continued)

OTHER PUBLICATIONS

Dongsheng Ma et al., "A Pseudo-CCM/DCM SIMO Switching Converter With Freewheel Switching", IEEE Journal of Solid-State Circuits, vol. 38, No. 6, pp. 1007-1014, Jun. 2003.

(Continued)

*Primary Examiner* — Matthew Nguyen
*Assistant Examiner* — Yusef Ahmed
(74) *Attorney, Agent, or Firm* — Rabin & Berdo, P.C.

(57) ABSTRACT

Provided is a DC-DC converter including an inductor configured to store input energy, a ground switch configured to provide a ground path of the inductor in response to a first signal, an inductor switch connected in parallel to the inductor so as to maintain the energy stored in the inductor in response to a second signal, output switches configured to output the energy stored in the inductor as multi-output voltages in response to third signals, and a switch controller including a switch controller configured to determine cross regulation between the multi-outputs and generate the first to third signals for decreasing the cross regulation.

14 Claims, 19 Drawing Sheets

(56) References Cited

U.S. PATENT DOCUMENTS

| | | | | |
|---|---|---|---|---|
| 2002/0079869 A1* | 6/2002 | Fujiwara | ............... | H02J 7/0031 320/157 |
| 2004/0201281 A1* | 10/2004 | Ma | ................. | H02M 3/158 307/38 |
| 2005/0264271 A1* | 12/2005 | Lam | ................. | H02M 1/10 323/282 |
| 2008/0055946 A1* | 3/2008 | Lesso | ................. | H02M 3/158 363/63 |
| 2008/0231115 A1* | 9/2008 | Cho | ................. | H02J 1/08 307/41 |
| 2010/0039080 A1* | 2/2010 | Schoenbauer | ...... | H02M 3/1582 323/234 |
| 2011/0043181 A1* | 2/2011 | Jing | ................. | H02M 3/158 323/288 |
| 2011/0169468 A1* | 7/2011 | Wu | ................. | H02M 3/157 323/282 |
| 2012/0043947 A1* | 2/2012 | Wilson | ............... | H02M 3/1582 323/234 |
| 2012/0169307 A1* | 7/2012 | Chen | ................. | H02M 3/158 323/271 |
| 2012/0286576 A1* | 11/2012 | Jing | ................. | H02M 3/156 307/43 |
| 2012/0326691 A1* | 12/2012 | Kuan | ................. | H02M 3/158 323/299 |
| 2013/0082668 A1* | 4/2013 | Tseng | ................. | H02M 3/158 323/267 |
| 2013/0093407 A1* | 4/2013 | Heo | ................. | H02M 3/156 323/290 |
| 2013/0127548 A1* | 5/2013 | Popplewell | ........... | H03F 1/0227 330/297 |
| 2013/0229058 A1* | 9/2013 | Chen | ................. | H02J 1/00 307/31 |
| 2014/0084889 A1* | 3/2014 | Kuroiwa | ............... | H02M 3/157 323/283 |
| 2015/0180336 A1 | 6/2015 | Heo et al. | | |

OTHER PUBLICATIONS

Min-yong Jung et al., "An Error-Based Controlled Single-Inductor 10-Output DC-DC Buck Converter with High Efficiency at Light Load Using Adaptive Pulse Modulation", 2015 IEEE International Solid-State Circuits Conference—(ISSCC) Digest of Technical Papers, Session 12, pp. 222-224, Feb. 24, 2015.

* cited by examiner

SINGLE INDUCTOR MULTI-OUTPUT DC-DC CONVERTER AND OPERATING METHOD THEREOF

CROSS-REFERENCE TO RELATED APPLICATIONS

This U.S. non-provisional patent application claims priority under 35 U.S.C. §119 of Korean Patent Application No. 10-2016-0003295, filed on Jan. 11, 2016, the entire contents of which are hereby incorporated by reference.

BACKGROUND

The present disclosure herein relates to a DC-DC converter, and more particularly, to a single-inductor multi-output DC-DC converter and an operating method thereof.

A DC-DC converter receives a DC voltage and boosts or steps down the DC voltage to a stable voltage which is required for an output stage. Recently, various electronic devices require multi-output DC-DC converters due to an increase in functions or in cases where a plurality of devices using difference voltages are adopted. There are various multi-output DC-DC converters including a multi-inductor multi-output (MIMO) DC-DC converter, or a single-inductor multi-output (SIMO) DC-DC converter. The MIMO DC-DC converter, which uses inductors as many as the number of outputs, causes an increase in area and cost.

The SIMO DC-DC converter may reduce the area and cost by using a single inductor in comparison to the MIMO DC-DC converter. In addition, the SIMO DC-DC converter may be used in an electronic device such as a wearable device or a smartphone which is powered by a battery. Despite the above-described advantages, the SIMO DC-DC converter may have cross regulation occurring due to use of a single inductor.

SUMMARY

The present disclosure provides a single-inductor multi-output DC-DC converter with reduced cross regulation, and an operating method thereof.

An embodiment of the inventive concept provides a DC-DC converter including: an inductor configured to store input energy; a ground switch configured to provide a ground path of the inductor in response to a first signal; an inductor switch connected in parallel to the inductor so as to maintain the energy stored in the inductor in response to a second signal; output switches configured to output the energy stored in the inductor as multi-output voltages in response to third signals; and a switch controller including a switch controller configured to determine cross regulation between the multi-outputs and generate the first to third signals for decreasing the cross regulation.

In an embodiments of the inventive concept, an operation method of a DC-DC converter, includes: monitoring multi-output voltages; determining whether the multi-output voltages deviate from a pre-determined voltage range; determining whether cross regulation occurs between the multi-output voltages when the multi-output voltages deviate from the pre-determined voltage range; and controlling pulse widths of control signals of an inductor switch, a ground switch, output switches inducing cross regulation, and output switches receiving cross regulation, when the cross regulation occurs.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
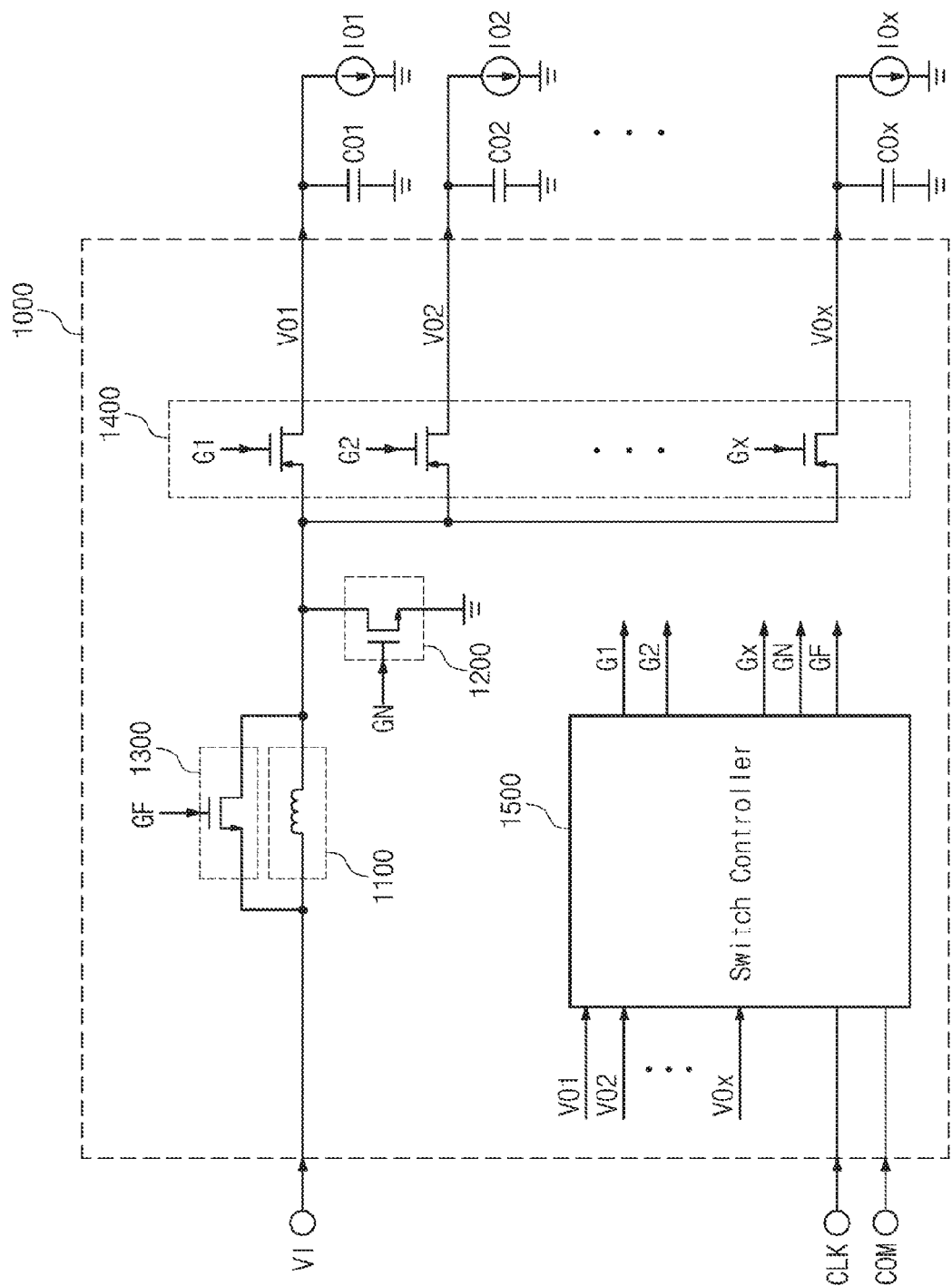
FIG. 1 is a block diagram of an exemplary DC-DC converter according to an embodiment of the present disclosure.

Hereinafter, an exemplary embodiment of the present invention will be described in detail with reference to the accompanying drawings such that a person skilled in the art may easily carry out the embodiments of the present invention. The present disclosure may be variously modified and realized in various forms, and thus specific embodiments will be exemplified in the drawings and described in detail hereinbelow. However, the present invention is not limited to the specific disclosed forms, and needs to be construed to include all modifications, equivalents, or replacements included in the spirit and technical range of the present invention. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an exemplary DC-DC converter according to an embodiment of the present disclosure. Referring to FIG. 1, a DC-DC converter 1000 may include an inductor 1100, a ground switch 1200, an inductor switch 1300, output switches 1400 corresponding to multi-outputs, and a switch controller 1500 for controlling the switches. The DC-DC converter 1000 may store energy through an input stage VI and may deliver the energy to the multi-outputs. In FIG. 1, the multi-outputs may be modeled with capacitors CO1, CO2, . . . , COx, and current sources IO1, IO2, . . . , IOx.

The inductor 1100 may be connected between the input stage VI and the output switches 1400. When an external voltage is applied to the input stage VI, current in the inductor 1100 may increase to store external energy. Through operations of the switches to be described later, the energy stored in the inductor 1100 may be delivered to the multi-outputs.

The ground switch 1200 may be connected between the ground and the inductor 1100 to provide the ground to the inductor 1100. To this end, a single N-channel metal oxide semiconductor (NMOS) may be adopted as the ground switch 1200. When the inductor 1100 stores energy, the ground switch 1200 is turned on according to a control of a ground switch control signal GN (a first signal) to provide a connection path between the inductor 1100 and the ground. The ground switch 1200 may prevent the energy stored in the inductor 1100 from being delivered to the multi-outputs.

The inductor switch 1300 may be connected in parallel to the inductor 1100. To this end, a single P-channel metal oxide semiconductor (PMOS) may be adopted as the inductor switch 1300. When being turned on according to a control of the inductor switch control signal GF (a second signal), the inductor switch 1300 may eliminate a voltage difference between both ends of the inductor 1100. In this way, the inductor switch 1300 may maintain the current of the inductor 1100 constant. Accordingly, the inductor switch 1300 may continuously store energy, which remains after the delivery to the multi-outputs, in the inductor 1100. The inductor switch 1300 may be called as a freewheel switch.

The output switches 1400 may be connected between the inductor 1100 and the outputs. The output switches 1400 may provide paths between the inductor 1100 and the multi-outputs by the output switch control signals G1, G2, . . . Gx (third signals). To this end, a single PMOS may be adopted as each of the output switches 1400.

The switch controller 1500 may generate control signals GN, GF, G1, G2, . . . , Gx for controlling the ground switch 1200, the inductor switch 1300, and the output switches 1400. To this end, the switch controller 1500 may receive each output voltage VO1, VO2, . . . VOx of the outputs.

The switch controller 1500 may receive a clock CLK and a communication signal COM input from the outside. The switch controller 1500 may set, using the clock CLK and the communication signal COM, a reference voltage of each output, an upper limit voltage of each output, a lower limit voltage of each output, whether cross regulation between the outputs occurs, or initial pulse widths of switch control signals.

Here, the reference voltage may be a target voltage of the output voltage. The upper limit voltage may mean a voltage variation magnitude, which may be higher than the target voltage. The lower limit voltage may mean a voltage variation magnitude, which may be lower than the target voltage. The reference upper limit voltage may mean the magnitude of a voltage obtained by adding the reference voltage to the upper limit voltage. The reference lower limit voltage may mean the magnitude of a voltage obtained by subtracting the lower limit voltage from the reference voltage. Hereinafter, a range between the reference upper limit voltage and the reference lower limit voltage is called as pre-determined voltage range. In other words, the DC-DC converter 1000 may drive multi-output voltages so as to vary within the pre-determined voltage range.

Hereinafter, for the present disclosure, a case where the number of the multi-outputs is 3 in the SIMO DC-DC converter will be described. Accordingly, the multi-output voltages may be VO1, VO2, and VO3, and the control signals of the output switches 1400 may be G1, G2, and G3.

Figure 2A:
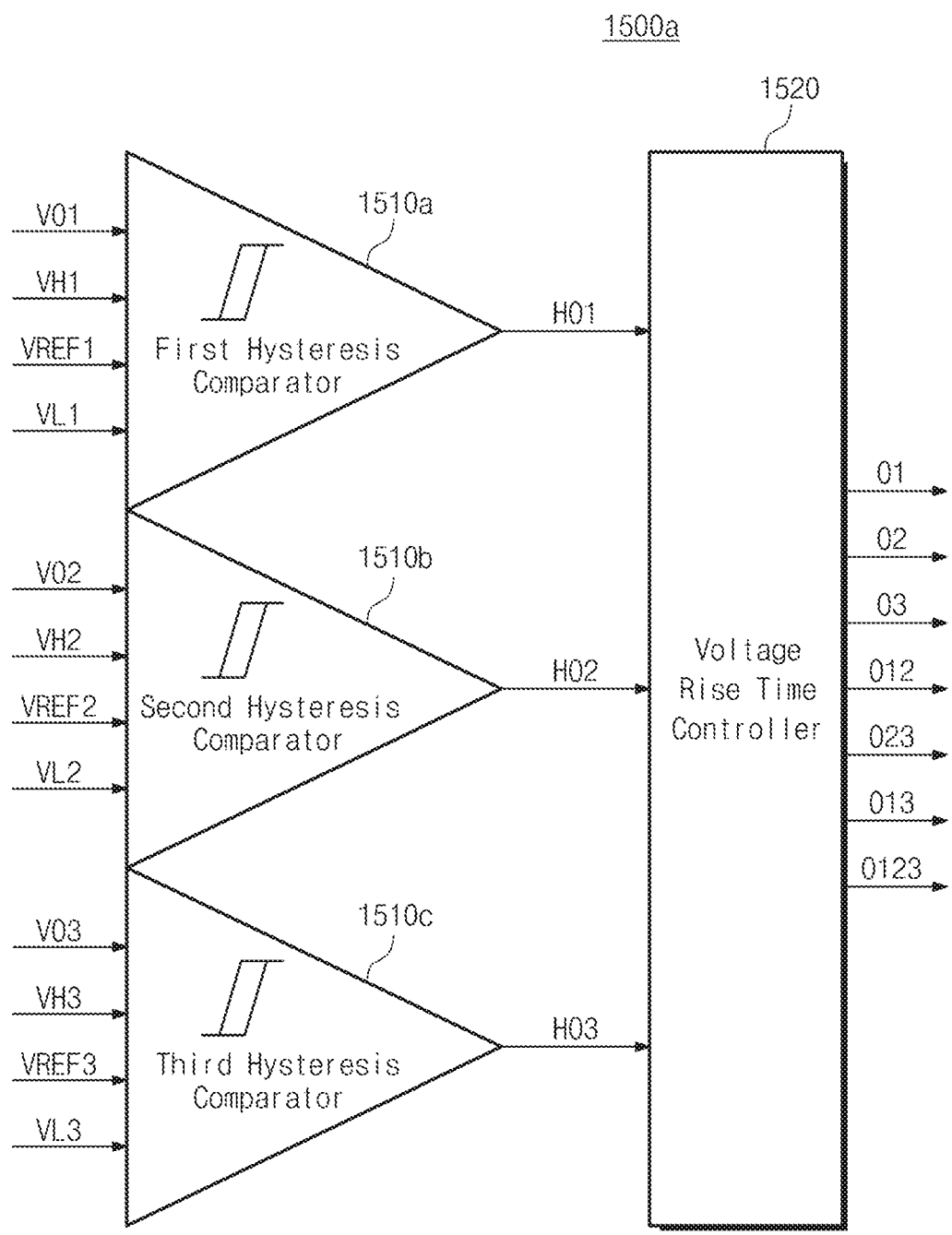
FIGS. 2A to 2C exemplarily illustrates the switch controller illustrated in FIG. 1.
Figure 2B:
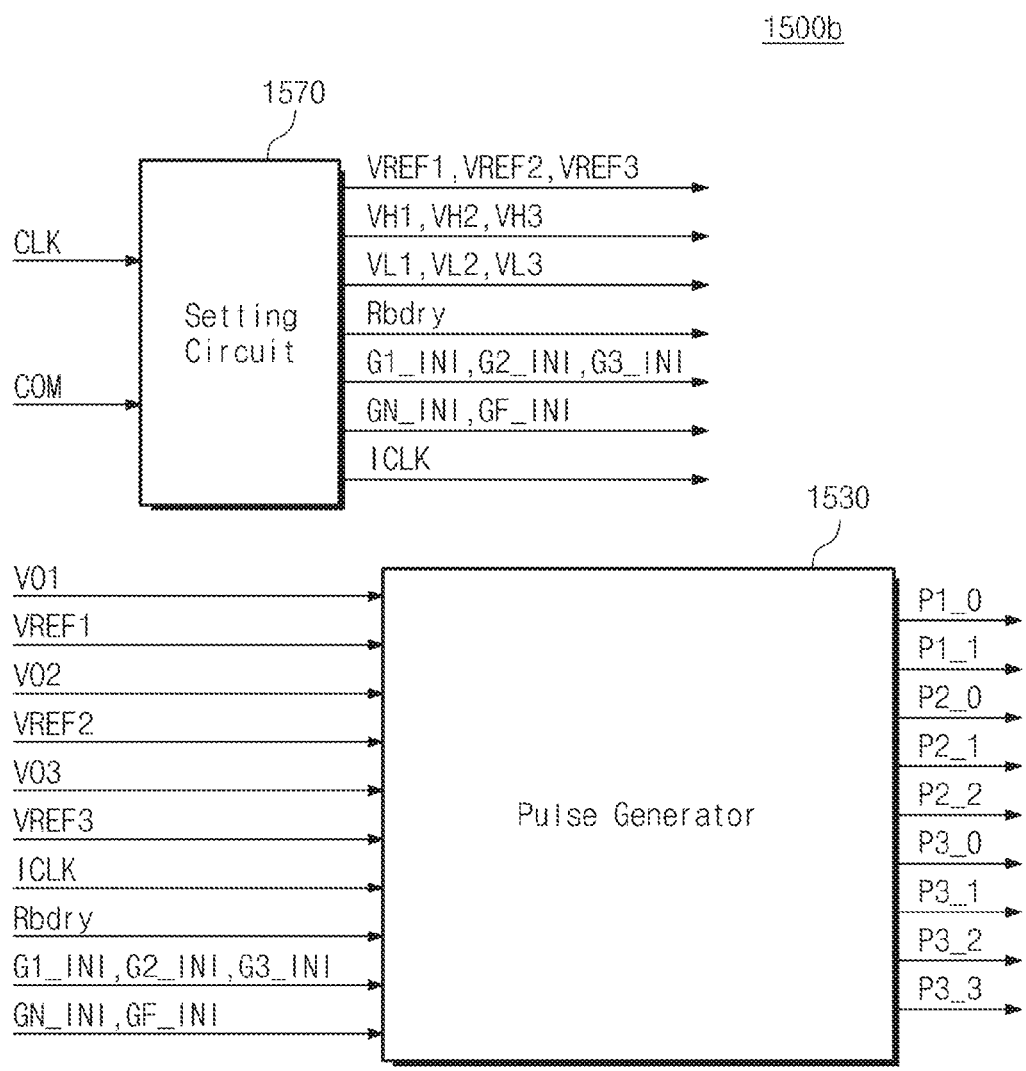
Figure 2C:
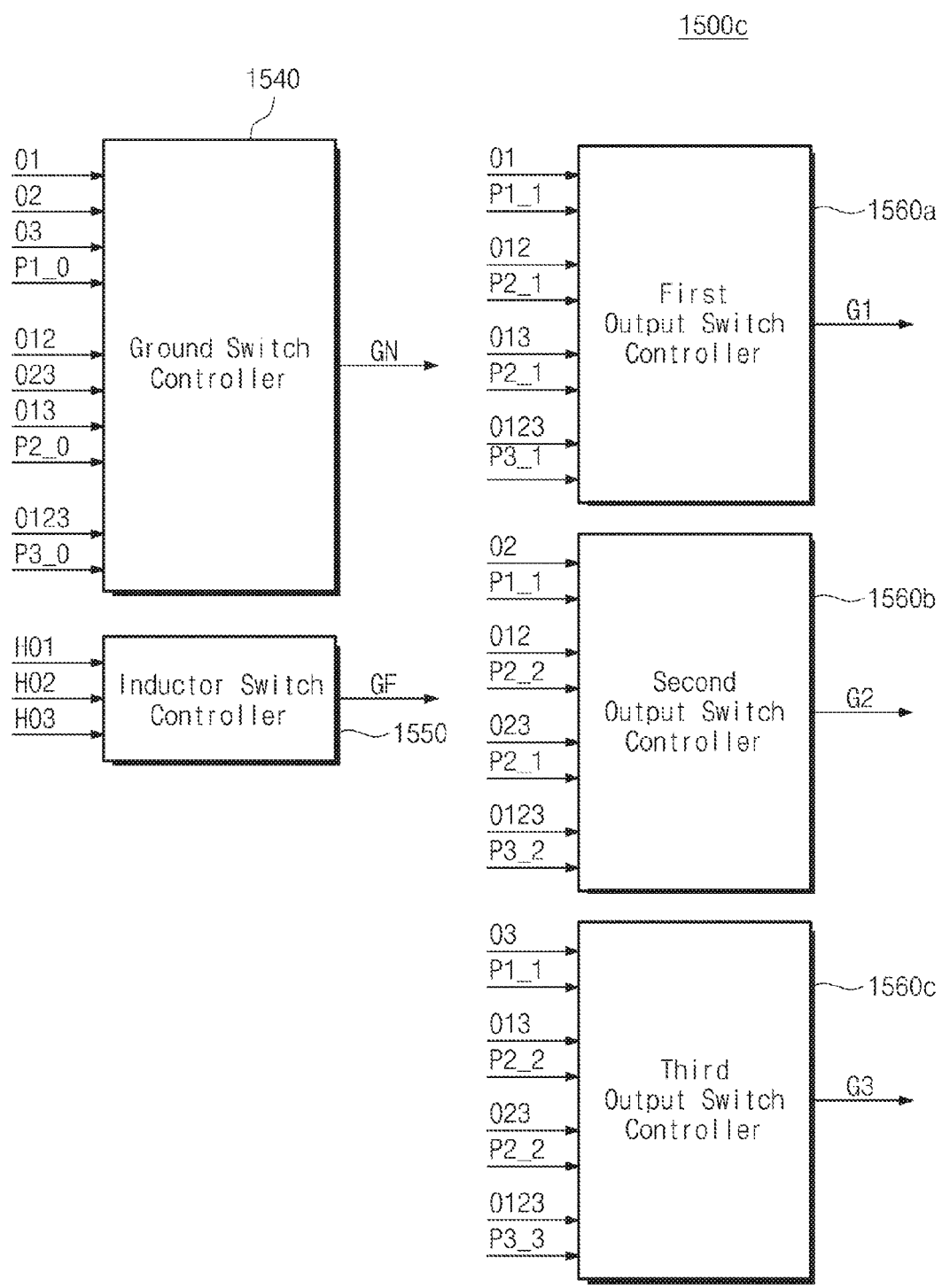

FIGS. 2A to 2C is the exemplary switch controller illustrated in FIG. 1. Referring to FIGS. 2A to 2C, the switch controller 1500a-1500c may include a first hysteresis comparator 1510a, a second hysteresis comparator 1510b, a third hysteresis comparator 1510c, a voltage rise time controller 1520, a pulse generator 1530, a ground switch controller 1540, an inductor switch controller 1550, a first output switch controller 1560a, a second output switch controller 1560b, a third output switch controller 1560c, and a setting circuit 1570.

The first hysteresis comparator 1510a may receive the first output voltage VO1, the reference voltage VREF1 generated by the setting circuit 1570, the upper limit voltage VH1 generated by the setting circuit 1570, and the lower limit voltage VL1 generated by the setting circuit 1570, and generate the hysteresis output HO1.

The hysteresis output HO1 of the first hysteresis comparator 1510a may become High when the first output voltage VO1 becomes higher and then lower than the reference lower limit voltage VREF1-VL1, and become Low when the first output voltage VO1 becomes lower and then higher than the reference upper limit voltage VREF1+VH1. The phase of the hysteresis output HO1 may also be set opposite to the above-described.

The second hysteresis comparator 1510b may receive the second output voltage VO2, the reference voltage VREF2 generated by the setting circuit 1570, the upper limit voltage VH2 generated by the setting circuit 1570, and the lower limit voltage VL2 generated by the setting circuit 1570, and generate the hysteresis output HO2. Other than the above-described input/output signal changes, the second hysteresis comparator 1510b performs the same operation as the first hysteresis comparator 1510a and accordingly a description thereabout will be omitted.

The third hysteresis comparator 1510c may receive the third output voltage VO3, the reference voltage VREF3 generated by the setting circuit 1570, the upper limit voltage VH3 generated by the setting circuit 1570, and the lower limit voltage VL3 generated by the setting circuit 1570, and generate the hysteresis output HO3. Other than the above-described input/output signal changes, the third hysteresis comparator 1510c performs the same operation as the first hysteresis comparator 1510a and accordingly a description thereabout will be omitted.

Figure 3:
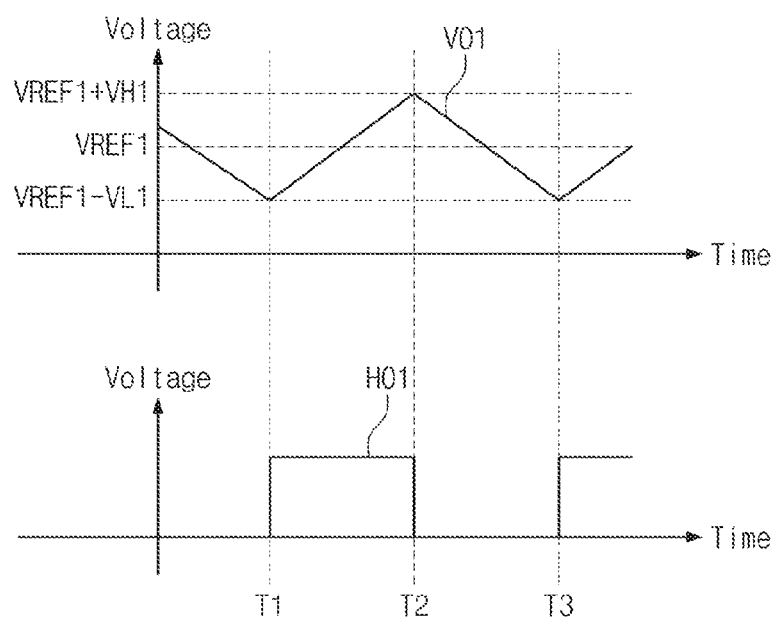
FIG. 3 is a timing diagram exemplarily showing an operation of the first hysteresis comparator illustrated in FIG. 2A.

FIG. 3 is a timing diagram exemplarily showing an operation of the first hysteresis comparator illustrated in FIG. 2A. In FIG. 3, the horizontal axis represents time and the vertical axis represents voltage. The timing diagram of FIG. 3 represents the first output voltage VO1 and the hysteresis output HO1, when the DC-DC converter 1000 normally drives the first output voltage VO1. In this case, referring to FIG. 3, the first output voltage VO1 may vary only between the reference upper limit voltage VREF1+VH1 and the reference lower limit voltage VREF-VL1.

At time T1, the first output voltage VO1 becomes higher and then lower than the reference lower limit voltage VREF1-VL1. Accordingly, the first output voltage VO1 becomes risen by the operation of the switch controller 1500a-1500c to be described later. The hysteresis output HO1 may be changed from Low to High at time T1.

At time T2, the first output voltage VO1 becomes lower and then higher than the reference upper limit voltage VREF+VH1. Accordingly, the first output voltage VO1 becomes dropped by the operation of the switch controller 1500a-1500c to be described later. The hysteresis output HO1 may be changed from High to Low at time T2.

At time T3, the first output voltage VO1 becomes higher and then lower than the reference lower limit voltage VREF1-VL1. Identically to the operation at time T1, the hysteresis output HO1 may be changed from High to Low at time T3.

Figure 4:
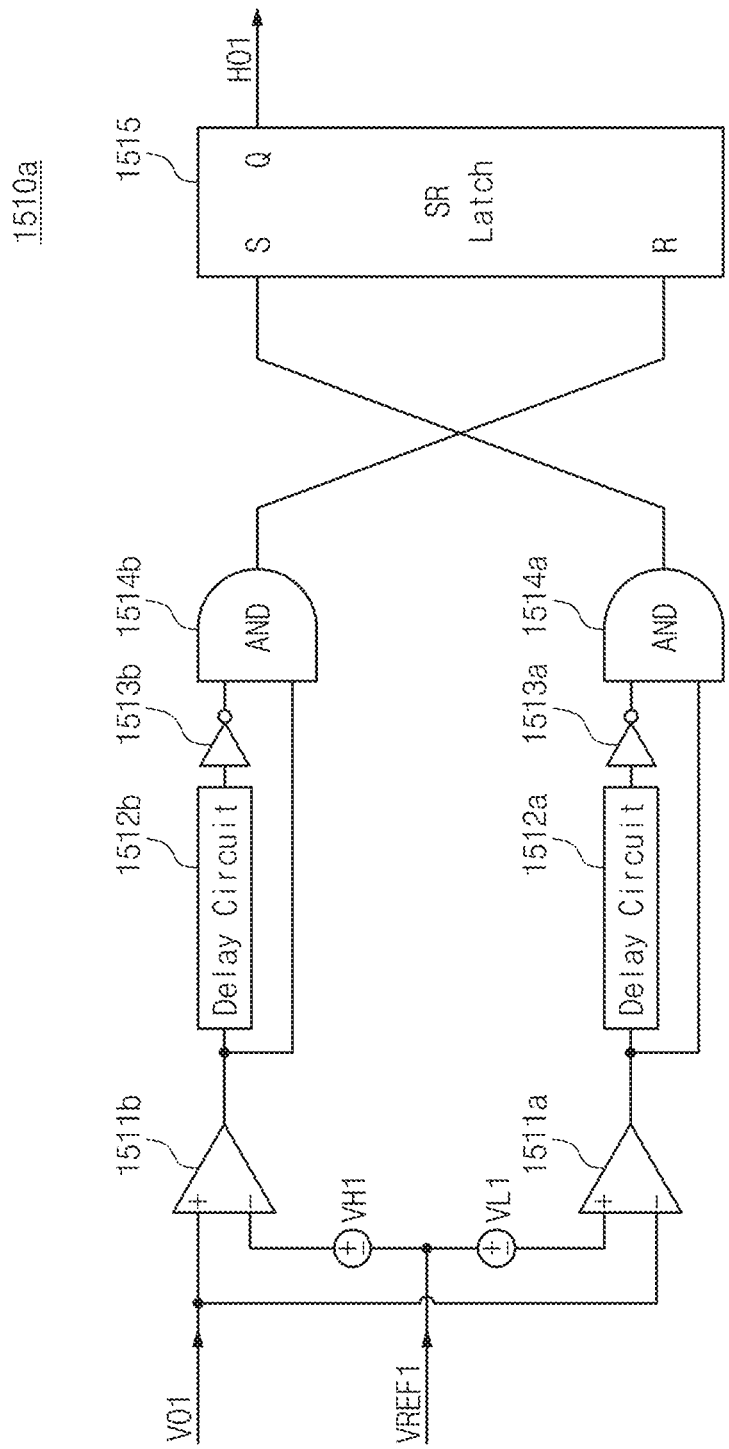
FIG. 4 is a block diagram exemplarily showing the first hysteresis comparator illustrated in FIG. 2A.

FIG. 4 is a block diagram exemplarily showing the first hysteresis comparator illustrated in FIG. 2A. Referring to FIG. 4, the hysteresis comparator 1510a may include comparators 1511a and 1511b, delay circuits 1512a and 1512b, inverters 1513a and 1513b, and logical AND circuits 1514a and 1514b, and a Set-Reset (SR) latch 1515.

The first comparator 1511a receives the first output voltage VO1 as a minus input and the reference lower limit voltage VREF-VL1 as a plus input, and compares the two voltages. The first comparator 1511a may compare the first output voltage VO1 and a variable minimum voltage VREF1-VL1. When the first output voltage VO1 becomes higher and then lower than the reference lower limit voltage VREF1-VL1, an output of the first comparator 1511a may vary from Low to High. This operation may be considered as an operation at time T1 in the foregoing operation in relation to FIG. 3.

The output of the first comparator 1511a may be directly input to the logical AND circuit 1514a or may pass through the inverter 1513a via the delay circuit 1512a and then input to the logical AND circuit 1514a. When the first output voltage VO1 becomes higher and then lower than the reference lower limit voltage VREF1-VL1, the logical AND circuit 1514a may generate a Set pulse of the SR latch 1515 as long as the delay time of the delay circuit 1512a. The SR latch 1515 may vary the hysteresis output HO1 from Low to High due to the Set pulse. This operation may be considered as an operation at time T1 in the foregoing operation in relation to FIG. 3.

The second comparator 1511b receives the first output voltage VO1 as a plus input and the reference upper limit voltage VREF+VH1 as a minus input and compares the two voltages. The second comparator 1511a may compare the first output voltage VO1 and a variable maximum voltage VREF1+VL1. When the first output voltage VO1 becomes lower and then higher than the reference upper limit voltage VREF1+VH1, an output of the first comparator 1511a may vary from Low to High. This operation may be considered as an operation at time T2 in the foregoing operation in relation to FIG. 3.

The output of the second comparator 1511b may be directly input to the logical AND circuit 1514b or may pass through the inverter 1513b via the delay circuit 1512b and then input to the logical AND circuit 1514b. When the first output voltage VO1 becomes lower and then higher than the reference upper limit voltage VREF1+VH1, the logical AND circuit 1514b may generate a Reset pulse of the SR latch 1515 as long as the delay time of the delay circuit 1512b. The SR latch 1515 may vary the hysteresis output HO1 from High to Low due to the Reset pulse. This operation may be considered as an operation at time T2 in the foregoing operation in relation to FIG. 3.

The first and second delay circuits 1512a and 1512b may be configured by combining the even number of inverters in order that the input phase is not changed. The number of inverters is sufficient when the SR latch 1515 generates the Set or Reset pulse such that a current phase of the hysteresis output HO1 may be changed.

The SR latch 1515 may be configured by combining two NOR circuits or two NAND circuits. The SR latch 1515 may receive an output of the logical AND circuit 1514a as a set signal and an output of the logical AND circuit 1514b as a reset signal to generate the hysteresis output HO1.

Referring to FIG. 2A again, the voltage rise time controller 1520 may receive the output HO1 of the first hysteresis comparator 1510a, the output HO2 of the second hysteresis comparator 1510b, and the output HO3 of the third hysteresis comparator 1510c to output the voltage rise signals O1, O2, O3, O12, O23, O13, and O123.

Figure 5:
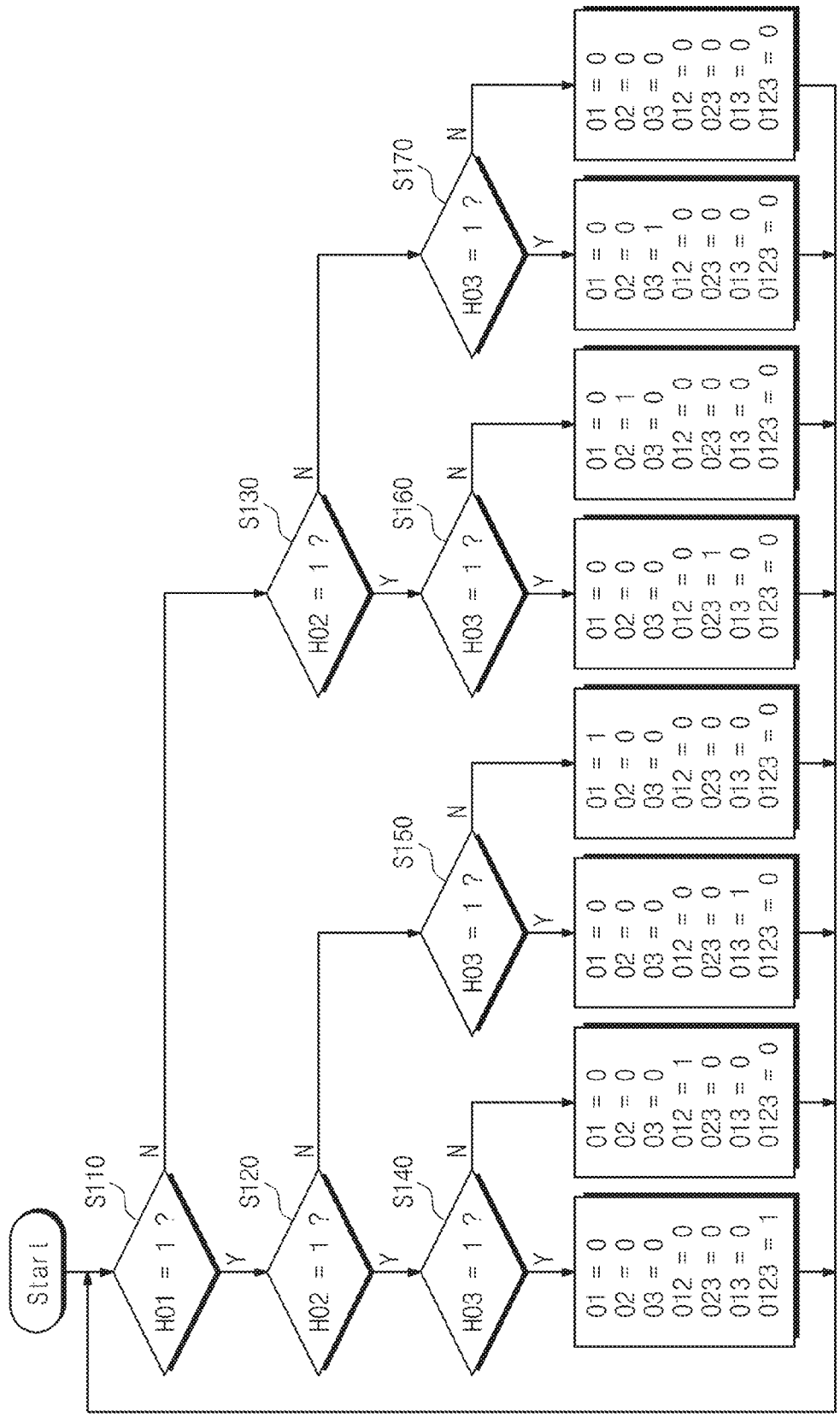
FIG. 5 is a flowchart showing an operation of the voltage rise time controller illustrated in FIG. 2A.

FIG. 5 is a flowchart showing an operation of the voltage rise time controller illustrated in FIG. 2A. Referring to FIG. 5, the voltage rise time controller 1520 may perform total 7 operations to output the voltage rise signals O1, O2, O3, O12, O23, O13, and O123.

In operation S110, the voltage rise time controller 1520 may determine whether the hysteresis output HO1 is the same as High. In operations S120 and S130, the voltage rise time controller 1520 may determine whether the hysteresis output HO2 is the same as High. In operations S140, S150, S160 and S170, the voltage rise time controller 1520 may determine whether the hysteresis output HO3 is the same as High.

When the hysteresis outputs HO1, HO2, and HO3 are all High, only the voltage rise signal O123 among the voltage rise signals O1, O2, O3, O12, O23, O13, and O123 may become High. All the remaining voltage rise signals may become Low.

When the hysteresis outputs HO1 and HO2 are High and the hysteresis output HO3 is Low, only the voltage rise signal O12 among the voltage rise signals O1, O2, O3, O12, O23, O13, and O123 may become High. All the remaining voltage rise signals may become Low.

When the hysteresis outputs HO1 and HO3 are High and the hysteresis output HO2 is Low, only the voltage rise signal O13 among the voltage rise signals O1, O2, O3, O12, O23, O13, and O123 may become High. All the remaining voltage rise signals may become Low.

When the hysteresis output HO1 is High and the hysteresis outputs HO2 and HO3 are Low, only the voltage rise signal O1 among the voltage rise signals O1, O2, O3, O12, O23, O13, and O123 may become High. All the remaining voltage rise signals may become Low.

When the hysteresis output HO1 is Low and the hysteresis outputs HO2 and HO3 are High, only the voltage rise signal O23 among the voltage rise signals O1, O2, O3, O12, O23, O13, and O123 may become High. All the remaining voltage rise signals may become Low.

When the hysteresis outputs HO1 and HO3 are Low and the hysteresis output HO2 are High, only the voltage rise signal O2 among the voltage rise signals O1, O2, O3, O12, O23, O13, and O123 may become High. All the remaining voltage rise signals may become Low.

When the hysteresis outputs HO1 and HO2 are Low and the hysteresis output HO3 is High, only the voltage rise signal O3 among the voltage rise signals O1, O2, O3, O12, O23, O13, and O123 may become High. All the remaining voltage rise signals may become Low.

When the hysteresis outputs HO1, HO2, and HO3 are all Low, the voltage rise signals O1, O2, O3, O12, O23, O13, and O123 may all become Low.

Subscripts of the voltage rise signals O1, O2, O3, O12, O23, O13, and O123 may represent outputs which require a voltage rise. For example, when the voltage rise signal O12 is High, it may represent that the first and second outputs require a voltage rise. When all the voltage rise signals O1, O2, O3, O12, O23, O13, and O123 are Low, it may represent that the first, second, and third outputs all do not require a voltage rise.

Referring to FIG. 2A again, the pulse generator 1530 may receive the multi-output voltages VO1, VO2, and VO3, the reference voltages VREF1, VREF2, and VREF3, an internal clock ICLK, cross regulation determination information Rbdry, initial pulse width information G1_INI, G2_INI, and G3_INI of the output switch control signals, initial pulse width information GN_INI for the ground switch control signal, and initial pulse width information GF_INI for the inductor switch control signal.

The pulse generator 1530 may generate pulse signals P1_0, P1_1, P2_0, P2_1, P2_2, P3_0, P3_1, P3_2, and P3_3 using the input information. Meanings of first and second subscripts of each pulse signal will be described with examples.

For example, it is assumed that only the first output requires a voltage rise. A first subscript of the pulse signal may mean the number of outputs which require a voltage rise. In this case, the pulse signals P1_0 and P1_1 may be activated by the pulse generator 1530. The pulse signal P1_0 may generate the ground switch control signal GN. The pulse signal P1_1 may generate the first output switch control signal G1. When the second output, instead of the first output, requires a voltage rise, the pulse signal P1_1 may generate the second output switch control signal G2.

For example, it is assumed that the first and third outputs require a voltage rise. The first subscript of the pulse signal may mean the number of outputs which require a voltage rise. In this case, the pulse signals P2_0, P2_1, and P2_2 may be activated by the pulse generator 1530. The pulse signal P2_0 may generate the ground switch control signal GN. The pulse signal P2_1 may generate the first output switch control signal G1. The pulse signal P2_2 may generate the third output switch control signal G3.

For example, it is assumed that the first, second, and third outputs require a voltage rise. The first subscript of the pulse signal may mean the number of outputs which require a voltage rise. In this case, the pulse signals P3_0, P3_1, P3_2, and P3_3 may be activated by the pulse generator 1530. The pulse signal P3_0 may generate the ground switch control signal GN. The pulse signal P3_1 may generate the first output switch control signal G1. The pulse signal P3_2 may generate the second output switch control signal G2. The pulse signal P3_2 may generate the third output switch control signal G3.

Figure 6A:
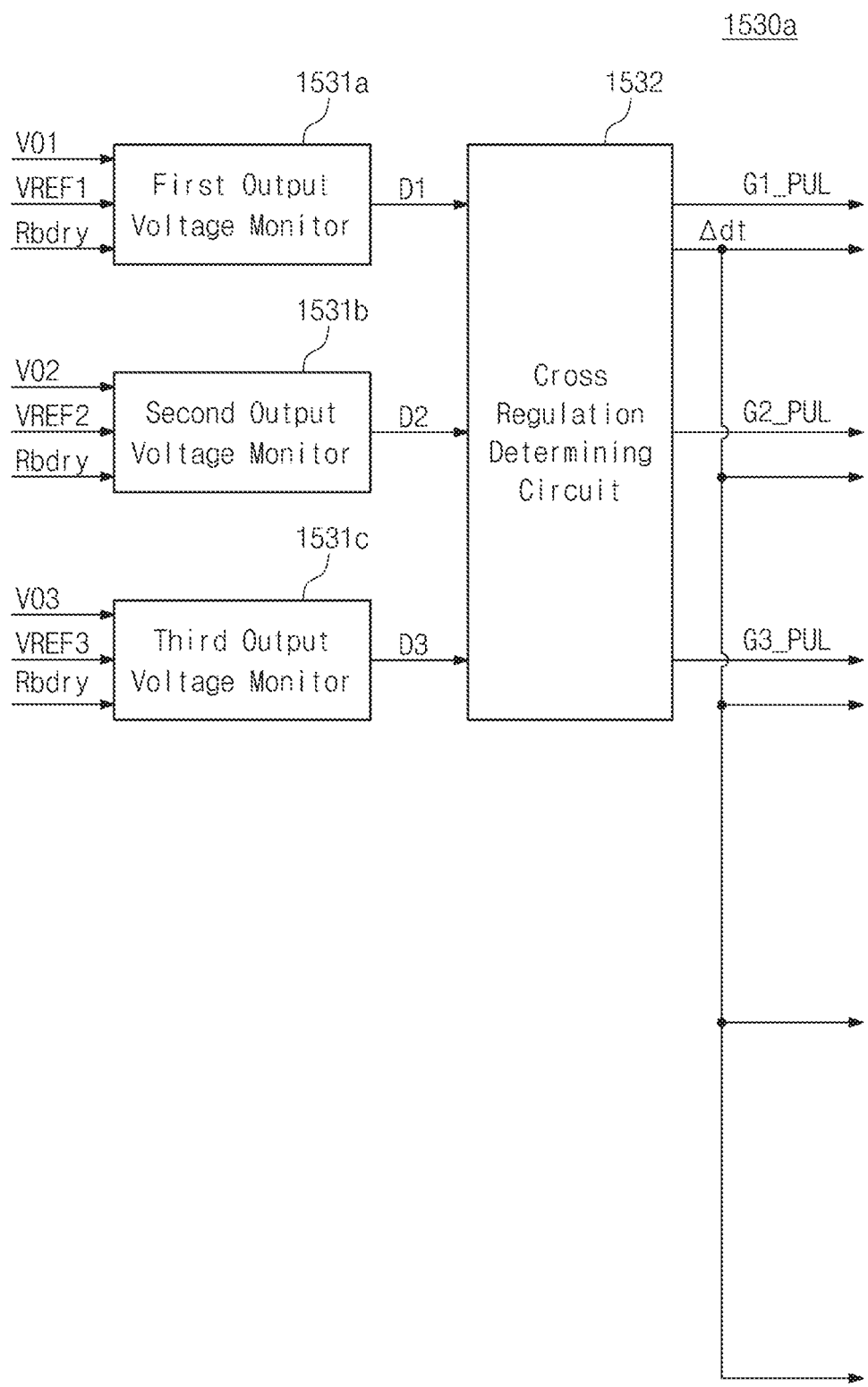
FIGS. 6A and 6B is an exemplary block diagram of the pulse generator illustrated in FIG. 2B.
Figure 6B:
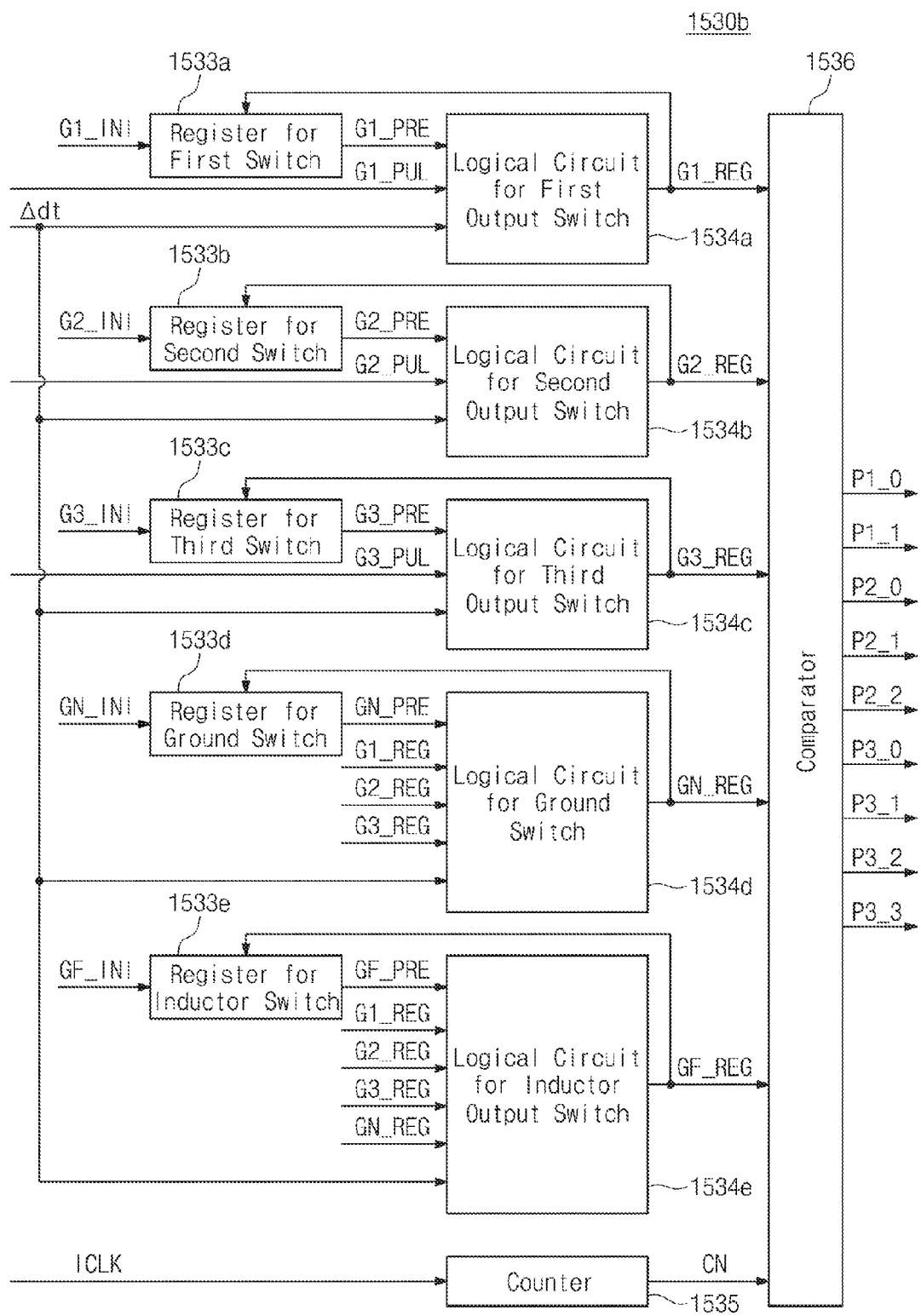

FIGS. 6A and 6B is an exemplary block diagram of the pulse generator illustrated in FIG. 2B. Referring to FIGS. 6A and 6B, the pulse generator 1530a-1530b may include a first output voltage monitor 1531a, a second output voltage monitor 1531b, a third output voltage monitor 1531c, a cross regulation determining circuit 1532, a register for first switch 1533a, a register for second switch 1533b, a register for third switch 1533c, a register for ground switch 1533d, an register for inductor switch 1533e, a logic circuit for first output switch 1534a, a logic circuit for second output switch 1534b, a logic circuit for third output switch 1534c, a logic circuit for ground switch 1534d, a logic circuit for inductor switch 1534e, a counter 1535, and a comparator 1536.

The first output voltage monitor 1531a may receive the first output voltage VO1, the reference voltage VREF1, and the cross regulation determination information Rbdry to generate a cross regulation determining signal D1. The first output voltage monitor 1531a may calculate the following equations 1 and 2.

$$M1 = \frac{|VO1 - VREF1|}{\left\{\frac{VH + VL}{2}\right\}} \quad (1)$$

$$D1 = 1(M1 < 1) \quad (2)$$
$$= 2(1 \le M1 < Rbdry)$$
$$= 3(M1 \ge Rbdry + 1)$$

The first output voltage monitor 1531a may monitor the first output voltage VO1 and the reference voltage VREF1. When the absolute value of the difference between the first output voltage VO1 and the reference voltage VREF1 is small such that a median value M1 thereof is smaller than 1, the first output voltage monitor 1531a may set the cross regulation determining signal D1 to 1. The first output voltage monitor 1531a may deliver the cross regulation determining signal D1 to the cross regulation determining circuit 1532.

In contrast, when the absolute value of the difference between the first output voltage VO1 and the reference voltage VREF1 is large such that the median value M1 is equal to or greater than 1 and is smaller than the cross regulation determination information Rbdry, the first output voltage monitor 1531a may set the cross regulation determining signal D1 to 2. This case may be determined as a case where cross regulation occurs in the first output by the second or third output. The cross regulation determination may be performed by the cross regulation determining circuit 1532. The operation of the cross regulation determining circuit 1532 will be described later.

When the absolute value of the difference between the first output voltage VO1 and the reference voltage VREF1 becomes larger than the above-described cases such that the median value M1 is greater than a value obtained by adding 1 to the cross regulation determination information Rbdry, the first output voltage monitor 1531a may set the cross regulation determining signal D1 to 3. This case may be determined as a case where a voltage rise or a voltage drop is necessary for the first output due to an abrupt increase or decrease in current consumption amount. The cross regulation determination may be performed by the cross regulation determining circuit 1532.

The second output voltage monitor 1531b may receive the second output voltage VO2, the reference voltage VREF2, and the cross regulation determination information Rbdry to generate a cross regulation determination signal D2. The second output voltage monitor 1531b may perform operations corresponding to Equations 1 and 2 identically to those of the first output voltage monitor 1531a only by replacing subscript 1 with subscript 2. A description thereabout will be omitted.

The third output voltage monitor 1531c may receive the third output voltage VO3, the reference voltage VREF3, and the cross regulation determination information Rbdry to generate a cross regulation determination signal D3. The third output voltage monitor 1531c may perform operations corresponding to Equations 1 and 2 identically to those of the first output voltage monitor 1531a only by replacing subscript 1 with subscript 3. A description thereabout will be omitted.

The cross regulation determining circuit 1532 may receive the cross regulation determining signal D1 of the first output voltage monitor, the cross regulation determining signal D2 of the second output voltage monitor, and the cross regulation determining signal D3 of the third output voltage monitor to generate update information G1_PUL, G2_PUL, and G3_PUL for the output switch control signals and a pulse interval Δdt.

The cross regulation determining circuit 1532 may determine that cross regulation occurs between the multi-outputs, when any one of the cross regulation determining signal D1 of the first output voltage monitor, the cross regulation determining signal D2 of the second output voltage monitor, and the cross regulation determining signal D3 of the third output voltage monitor is 2. Typically, in order that cross regulation occurs, since two or more outputs are required to deviate from a pre-determined voltage range, any one of cross regulation determining signals may become 3 and another cross regulation determination signal may become 2.

The cross regulation determining circuit 1532 may determine that cross regulation does not occur between the multi-outputs, when there is no 2 in any one of the cross regulation determining signal D1 of the first output voltage monitor, the cross regulation determining signal D2 of the second output voltage monitor, and the cross regulation determining signal D3 of the third output voltage monitor.

A criterion for determining, by the cross regulation determining circuit 1532, occurrence of cross regulation may depend on the cross regulation determination information Rbdry. The cross regulation determination information Rbdry may be determined by the number of outputs driven by the DC-DC converter 1000, types of the outputs, the size of the inductor 1100, and a characteristic of the input stage VI. The DC-DC converter 1000 according to the present disclosure may receive the external clock CLK and the communication signal COM and may allow a setting circuit 1570, which will be described later, to change the cross regulation determination information Rbdry. Through this, even when the number and types of outputs are changed, the DC-DC converter 1000 may properly drive the outputs.

The register for first switch 1533a may store initial pulse width information G1_INI of the first output switch control signal and an output G1_REG of the logic circuit for first output switch. The output G1_REG of the logic circuit for first output switch may mean pulse width information of a current first output switch control signal G1. The register for second switch 1533b, the register for third switch 1533c, the register for ground switch 1533d, and the register for inductor switch 1533e all perform the same function as that of the register for first switch 1533a, and descriptions thereabout will be omitted.

The logic circuit for first switch 1534a may receive previous pulse width information of the first output switch control signal G1_PRE, update information of the first output switch control signal G1_PUL, and the pulse interval Δdt to generate the current pulse width information G1_REG of the first output switch control signal.

The logic circuit for first output switch 1534a may continuously maintain a previous pulse interval when the update information G1_PUL of the output switch control signal of the cross regulation determining circuit 1532 becomes 0. This is because a current output voltage VO1 is within a pre-determined voltage range. The logic circuit for first output switch 1534a may change the previous pulse interval, when the update information G1_PUL of the output switch control signal of the cross regulation determining circuit 1532 is not 0. This is because a current output voltage VO1 is out of the pre-determined voltage range.

The logic circuit for second switch 1534b receives previous pulse width information of the second output switch control signal G2_PRE, update information of the second output switch control signal G2_PUL, and the pulse interval Δdt to generate the current pulse width information G2_REG of the second output switch control signal. An internal operation of the logic circuit for second output switch 1534b is the same as that of the logic circuit for first output switch 1534a, and a description thereabout will be omitted.

The logic circuit for third switch 1534c receives previous pulse width information of the third output switch control signal G3_PRE, update information of the third output switch control signal G3_PUL, and the pulse interval Δdt to generate the current pulse width information G3_REG of the third output switch control signal. An internal operation of the logic circuit for third output switch 1534c is the same as that of the logic circuit for first output switch 1534a, and a description thereabout will be omitted.

The logic circuit for ground switch 1534d receives previous pulse width information of the ground switch control signal GN_PRE, the pulse width information of first switch control signal G1_REG, the pulse width information of second switch control signal G2_REG, the pulse width information of the third output switch control signal G3_REG, and the pulse interval Δdt to generate the current pulse width information GN_REG of the ground output switch control signal.

The logic circuit for ground switch 1534d may calculate a time to store energy in the inductor 1100 through the pulse width information G1_REG of the first output switch control signal, the pulse width information G2_REG of the second output switch control signal, and the pulse width information G3_REG of the third output switch control signal.

The logic circuit for inductor switch 1534e receives previous pulse width information of the inductor switch control signal GF_PRE, the pulse width information of first switch control signal G1_REG, the pulse width information of second switch control signal G2_REG, the pulse width information of the third output switch control signal G3_REG, the pulse width information of the ground switch control signal GN_REG, and the pulse interval Δdt to generate the current pulse width information GF_REG of the inductor output switch control signal.

The logic circuit for inductor switch 1534e may calculate an energy supply time for all outputs through the pulse width information G1_REG of the first output switch control signal, the pulse width information G2_REG of the second output switch control signal, and the pulse width information G3_REG of the third output switch control signal. The logic circuit for inductor switch 1534e may calculate a time for storing energy in the inductor 1100 through the pulse width information of the ground switch control signal GN_REG. Through the times, the logic circuit for inductor switch 1534e may calculate a time left after a DC-DC converter 1000 delivers the energy to the multi-outputs.

The counter 1535 may receive the internal clock ICLK and count the internal clock ICLK to generate a counter output CN. The counter 1535 may deliver the counter output CN to the comparator 1536.

The comparator 1536 receives the pulse width information of the first output switch control signal G1_REG, the pulse width information of the second output switch control signal G2_REG, the pulse width information of the third output switch control signal G3_REG, the pulse width information of the ground output switch control signal GN_REG, the pulse width information of the inductor switch control signal GF_REG, and the counter output CN to generate the pulse signals P1_0, P1_1, P2_0, P2_1, P2_2, P3_0, P3_1, P3_2, and P3_3.

Figure 7A:
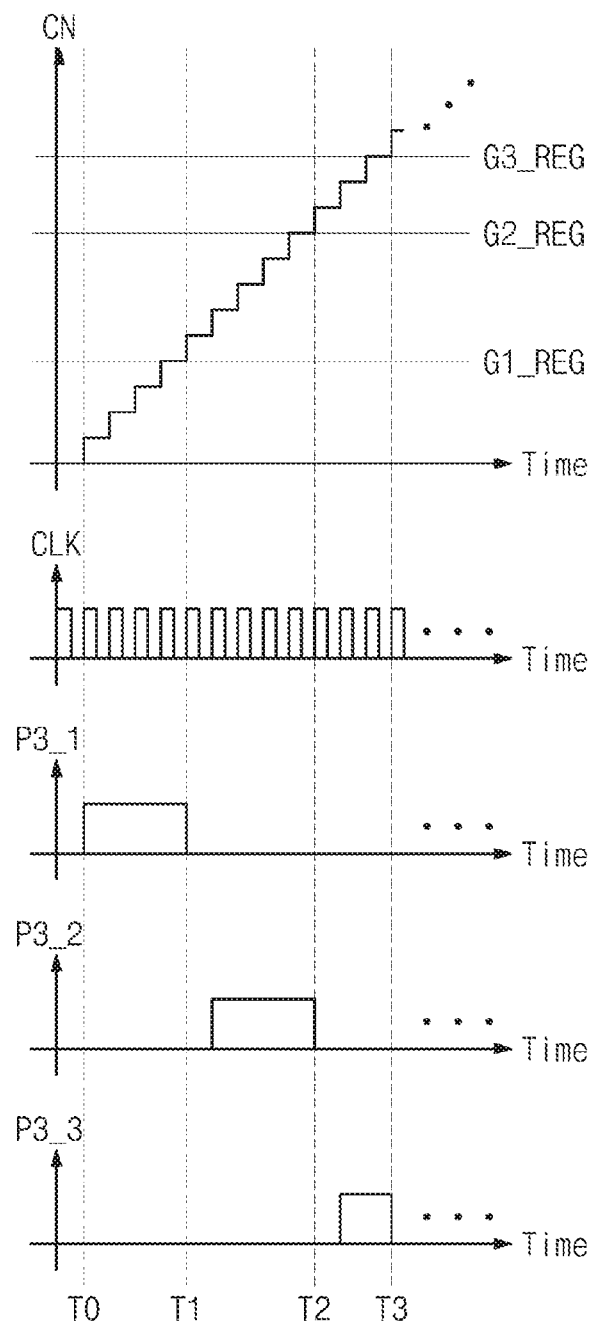
FIGS. 7A and 7B are timing diagrams exemplarily showing an operation of the pulse generator illustrated in FIGS. 6A and 6B.
Figure 7B:
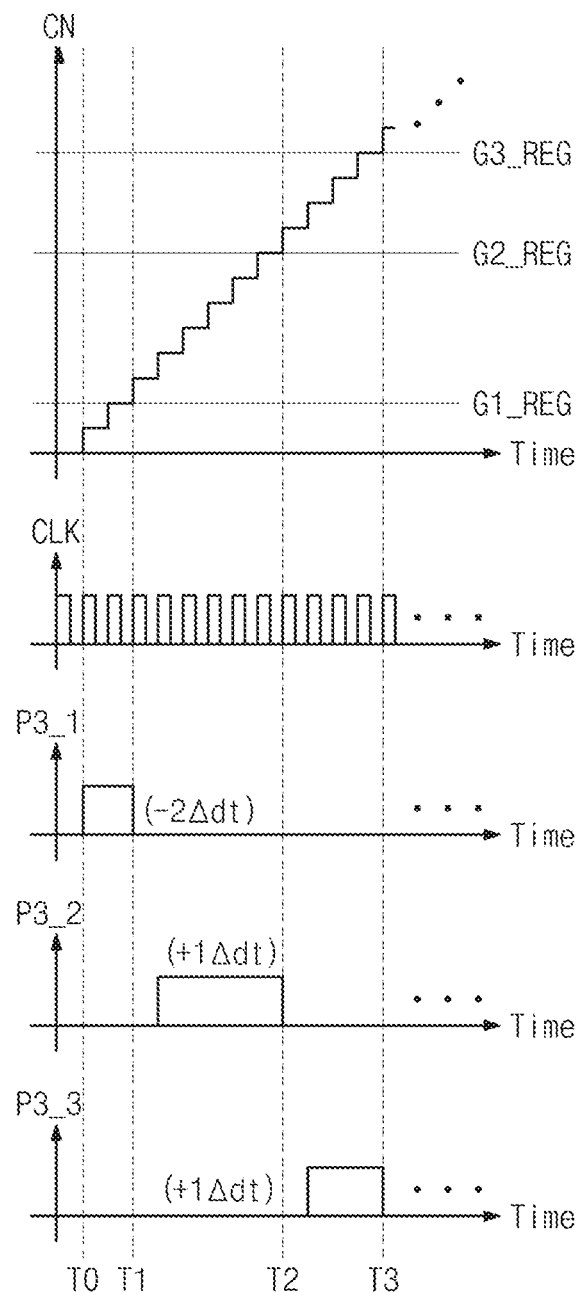

FIGS. 7A and 7B are timing diagrams exemplarily showing an operation of the pulse generator illustrated in FIGS. 6A and 6B. FIGS. 7A and 7B exemplarily illustrate an operation of the pulse generator 1530a-1530b, when a rapid increase occurs in the first output voltage VO1 and cross regulation occurs in the second and third voltages VO2 and VO3. In this case, the cross regulation determining signal D1 may become 3, the cross regulation determining signal D2 becomes 2, and the cross regulation determining signal D3 may become 2. Since the first output voltage VO1 requires a voltage drop, the second and third output voltages VO2 and VO3 require a voltage rise, the pulse generator 1530b may activate the pulse signals P3_1, P3_2, and P3_3.

Referring to FIG. 7A, the counter 1535 counts the internal clock ICLK according to time elapse to check a rise in counter output CN. At time T0, with the rise in the counter output CN, the pulse generator 1530b may begin to generate the pulse signal P3_1.

At time T1, when the counter output CN reaches the pulse width information of the first output switch control signal G1_REG, the pulse generator 1530b may stop generating the pulse signal P3_1 and may begin to generate the pulse signal P3_2 at a next internal clock ICLK.

At time T2, when the counter output CN reaches the pulse width information of the second output switch control signal G2_REG, the pulse generator 1530b may stop generating the pulse signal P3_2 and may begin to generate the pulse signal P3_3 at a next internal clock ICLK.

At time T3, when the counter output CN reaches the pulse width information of the third output switch control signal G3_REG, the pulse generator 1530b may stop generating the pulse signal P3_3.

Referring to FIG. 7B, the pulse generator 1530b may adjust the pulse signals P3_1, P3_2, and P3_3 in order to reduce cross regulations of the second and third output voltages VO2 and VO3. By the operation of the pulse generator 1530b described in relation to FIG. 6B, it may be checked that the pulse width information G1_PRE of the first output switch control signal, the pulse width information G2_PRE of the second output switch control signal, and the pulse width information G3_PRE of the third output switch control signal are changed in FIG. 7B.

At time T1, it may be checked that the pulse width of the pulse signal P3_1 decreases by 2Δdt in comparison to the pulse signal P3_1 described in relation to FIG. 7A. At time T2, it may be checked that the pulse width of the pulse signal P3_2 increases by 1 Δdt in comparison to the pulse signal P3_2 described in relation to FIG. 7A. At time T3, it may be checked that the pulse width of the pulse signal P3_3 increases by 1 Δdt in comparison to the pulse signal P3_3 described in relation to FIG. 7A.

Referring to FIGS. 7A and 7B, when a rapid increase occurs in the first output voltage VO1 and cross regulations occurs in the second and third output voltages VO2 and VO3, the DC-DC converter 1000 according to an embodiment of the present invention may decrease cross regulation by decreasing the pulse width of the first output switch control signal G1 and by increasing the pulse widths of the second and third output switch control signals G2 and G3.

Referring to FIG. 2C again, the ground switch controller 1540 may receive the pulse signals P1_0, P2_0, and P3_0 and the voltage rise signals O1, O2, O3, O12, O23, O13, and O123 to generate the ground switch control signal GN. The ground switch controller 1540 may require the pulse signals P1_0, P2_0, and P3_0 among the pulse signals P1_0, P1_1, P2_0, P2_1, P2_2, P3_0, P3_1, P3_2, and P3_3. This is because the ground switch controller 1540 is required to be able to adjust a time for storing energy in the inductor 1100 respectively when one output voltage deviates from a pre-determined voltage range, two output voltages deviate from a pre-determined voltage, or three output voltages deviate from a pre-determined voltage range.

The ground switch controller 1540 may determine, through the voltage rise signals O1, O2, and O3, whether one output voltage deviates from the pre-determined voltage range. The voltage switch controller 1540 may determine, through the voltage rise signals O12, O23, and O13, whether two output voltages deviate from the pre-determined voltage range. The voltage switch controller 1540 may determine, through the voltage rise signals O123, whether three output voltages deviate from the pre-determined voltage range.

Figure 8:
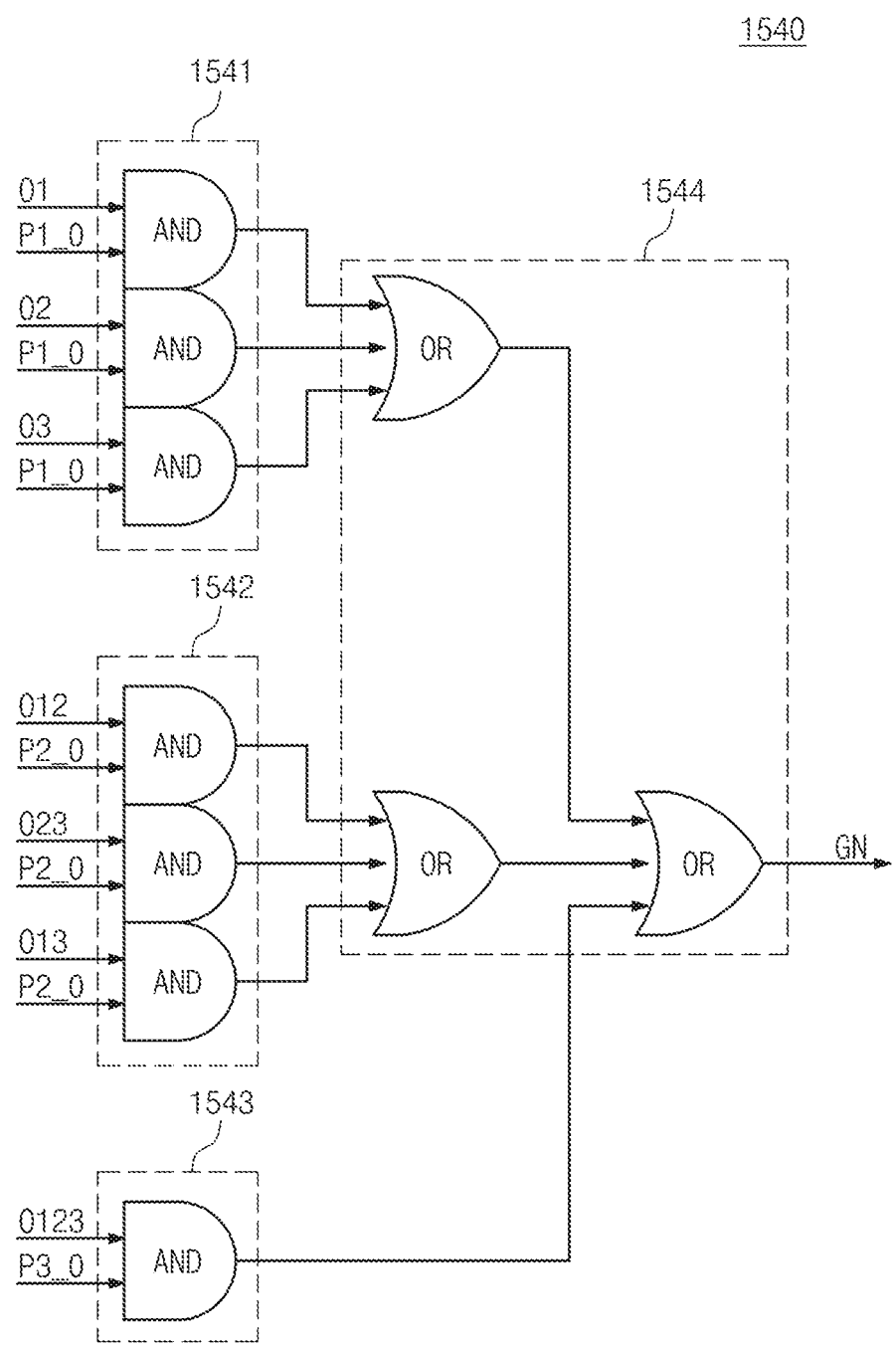
FIG. 8 is an exemplary block diagram of the ground switch controller illustrated in FIG. 2C.

FIG. 8 is an exemplary block diagram of the ground switch controller illustrated in FIG. 2C. The ground switch controller 1540 may include a first circuit 1541, a second circuit 1542, a third circuit 1543, and a logical OR circuit 1544. When the number of outputs is not 3, but increased to x, the ground switch controller 1540 may require x logical AND circuits.

The first logic circuit 1541 may include three logical AND circuits for respectively performing logical AND operations on voltage rise signals O1, O2, and O3 with the pulse signal P1_0. When one output voltage deviates from a pre-determined voltage range, the output of the first logic circuit 1541 may mean the pulse width of the ground switch control signal GN.

The second logic circuit 1542 may include three logical AND circuits for respectively performing logical AND operations on the voltage rise signals O12, O23, and O13 with the pulse signal P2_0. When two output voltages deviate from a pre-determined voltage range, the output of the second logic circuit 1542 may mean the pulse width of the ground switch control signal GN.

The third logic circuit 1543 may include one logical AND circuit for performing a logical AND operation on the voltage rise signal O123 with the pulse signal P3_0. When three output voltages deviate from a pre-determined voltage range, the output of the third logic circuit 1543 may mean the pulse width of the ground switch control signal GN.

The fourth logic circuit 1544 may receive outputs of the first, second, and third logic circuits 1541, 1542, and 1543 and perform a logical OR operation to generate the pulse width of the ground switch control signal GN.

Referring to FIG. 2C again, the inductor switch controller 1550 may receive the hysteresis outputs HO1, HO2, and HO3 to generate the inductor switch control signal GF. As the above-described, the hysteresis outputs HO1, HO2, and HO3 may indicate whether each output voltage requires a voltage rise. When all the output voltages are within a pre-determined voltage range, since it is not necessary to supply energy to the outputs any more, the inductor switch controller 1550 may store energy remaining in the inductor 1100 through the inductor switch control signal GF.

Figure 9:
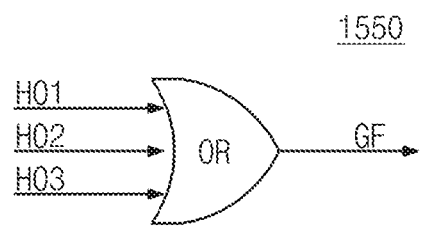
FIG. 9 is an exemplary block diagram of the inductor switch controller illustrated in FIG. 2C.

FIG. 9 is an exemplary block diagram of the inductor switch controller illustrated in FIG. 2C. Referring to FIG. 9, the inductor switch controller 1550 may include a logical OR circuit. When all the hysteresis outputs HO1, HO2, and HO3 are Low and all the output voltages are within the pre-determined voltage range, the inductor switch controller 1550 may make the inductor switch control signal GF Low. The inductor switch controller 1550 turns on the inductor switch 1300 to preserve the energy stored in the inductor 1100.

The first output switch controller 1560a may receive the pulse signals P1_1, P2_1, and P3_1 and the voltage rise signals O1, O12, O13, and O123 to generate the first output switch control signal G1. The first switch controller 1560*a* may require the pulse signals P1_1, P2_1, and P3_1 among the pulse signals P1_0, P1_1, P2_0, P2_1, P2_2, P3_0, P3_1, P3_2, and P3_3. This is because the first switch controller 1560*a* is required to be able to adjust a time for supplying energy to the first output, when the first output voltage VO1 deviates from a pre-determined voltage range.

Figure 10A:
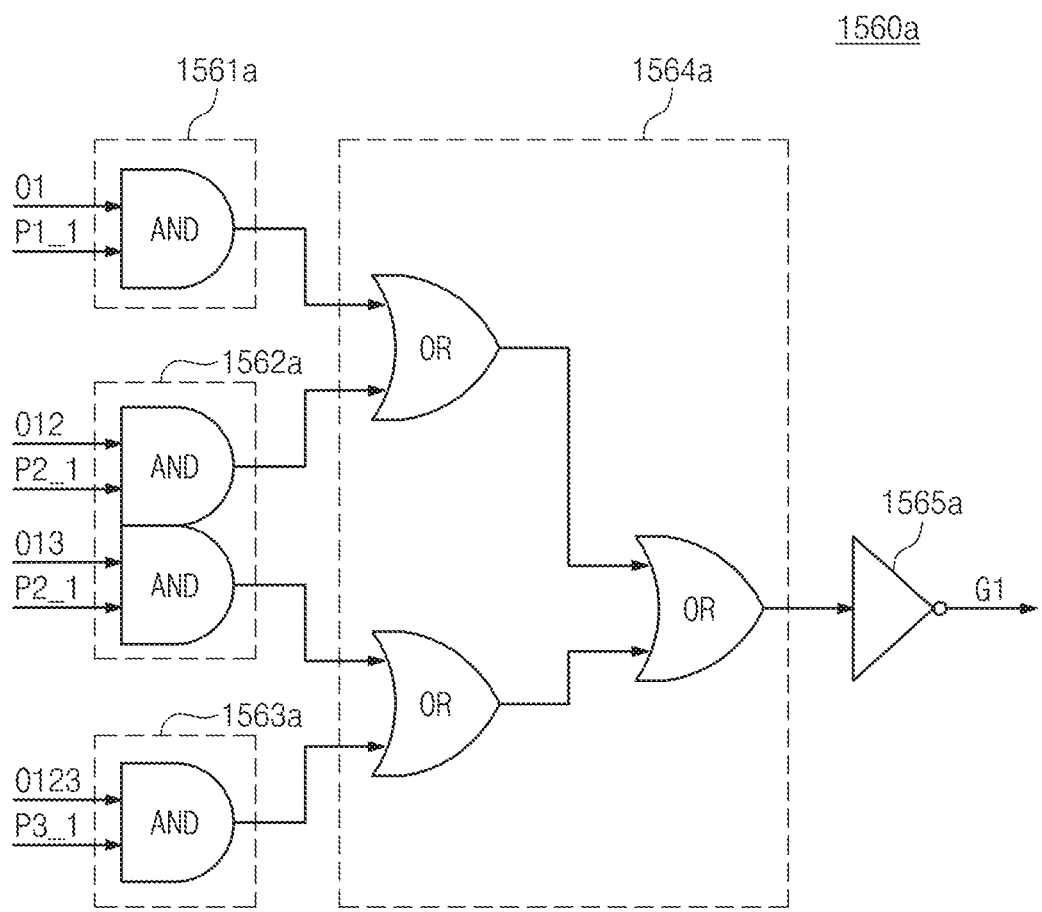
FIGS. 10A to 10C are exemplary block diagrams of the first to third output switch controllers illustrated in FIG. 2C.
Figure 10B:
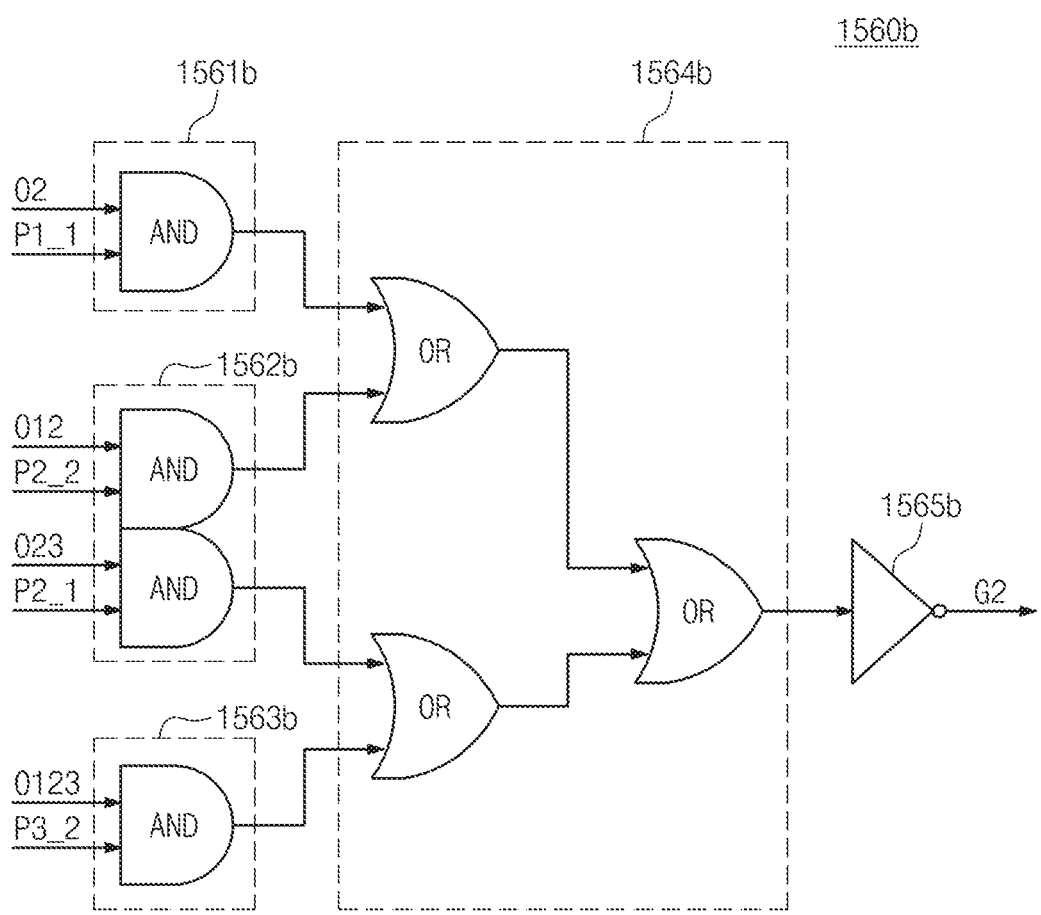
Figure 10C:
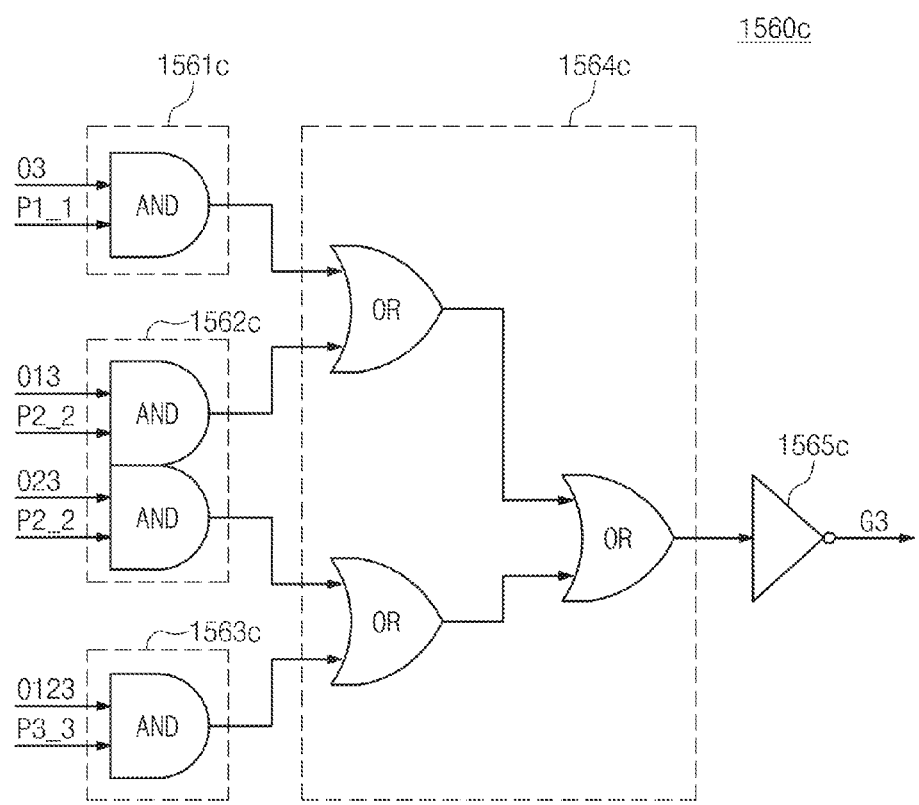

FIGS. 10A to 10C are exemplary block diagrams of the first to third output switch controllers illustrated in FIG. 2. Referring to FIG. 10A, the first output switch controller 1560*a* may include a first logic circuit 1561*a*, a second logic circuit 1562*a*, a third logic circuit 1563*a*, a fourth logic circuit 1564*a*, or an inverter 1565*a*.

The first logic circuit 1561*a* may include a logical AND circuit for performing a logical AND operation on the voltage rise signal O1 with the pulse signal P1_1. When the first output voltage VO1 deviates from a pre-determined voltage range, the output of the first logic circuit 1561*a* may mean the pulse width of the first switch control signal G1.

The second logic circuit 1562*a* may include a logical AND circuit for respectively performing logical AND operations on the voltage rise signals O12 and O13 with the pulse signal P2_1. When the first and second output voltages VO1 and VO2 deviate from a pre-determined voltage range or the first and third output voltages VO1 and VO3 deviate from a pre-determined voltage range, the output of the second logic circuit 1562*a* may mean the pulse width of the first output switch control signal G1.

The third logic circuit 1563*a* may include a logical AND circuit for performing a logical AND operation on the voltage rise signal O123 with the pulse signal P3_1. When the first output voltage VO1, the second output voltage VO2, and the third output voltage VO3 deviate from a pre-determined voltage range, the output of the third logic circuit 1563*a* may mean the pulse width of the first switch control signal G1.

The fourth logic circuit 1564*a* may receive outputs of the first, second, and third logic circuits 1561*a*, 1562*a*, and 1563*a* and perform a logical OR operation to generate the pulse width of the first switch control signal G1.

The inverter 1565*a* may change the phase of the output of the logical OR circuit 1564*a* to generate the pulse width of the first output switch control signal G1. The inverter 1565*a* may be used for determining the turn-on or turn-off phase according to the first output switch type. The inverter 1565*a* may not be used according to the first output switch type.

Referring to FIG. 10B, the second output switch controller 1560*b* may receive the pulse signals P1_1, P2_2, P2_1, and P3_2 and the voltage rise signals O2, O12, O23, and O123 to generate the second output switch control signal G2. The second switch controller 1560*b* may require the pulse signals P1_1, P2_2, P2_1 and P3_2 among the pulse signals P1_0, P1_1, P2_0, P2_1, P2_2, P3_0, P3_1, P3_2, and P3_3. This is because the second switch controller 1560*b* is required to be able to adjust a time for supplying energy to the second output, when the second output voltage VO2 deviates from a pre-determined voltage range. The structure of the second output switch controller 1560*b* is the same as that of the first output switch controller 1560*a*, and accordingly a description thereabout will be omitted.

Referring to FIG. 10C, the third output switch controller 1560*c* may receive the pulse signals P1_1, P2_2, and P3_3 and the voltage rise signals O3, O13, O23, and O123 to generate the second output switch control signal G2. The third switch controller 1560*c* may require the pulse signals P1_1, P2_2, and P3_3 among the pulse signals P1_0, P1_1, P2_0, P2_1, P2_2, P3_0, P3_1, P3_2, and P3_3. This is because the third switch controller 1560*c* is required to be able to adjust a time for supplying energy to the third output, when the third output voltage VO3 deviates from a predetermined voltage range. The structure of the third output switch controller 1560*c* is the same as that of the first output switch controller 1560*a*, and accordingly a description thereabout will be omitted.

Referring to FIG. 2B again, the setting circuit 1570 may generate the reference voltages VREF1, VREF2, and VREF3, the upper limit voltages VH1, VH2, and VH3, the lower limit voltages VL1, VL2, and VL3, the cross regulation determination information Rbdry, the initial pulse width information G1_INI, G2_INI, and G3_INI of the output switch control signals, the initial pulse width information GN_INI for the ground switch control signal, the initial pulse width information GF_INI of the inductor switch control signal, and the internal clock ICLK.

In order to generate the signals, the setting circuit 1570 may include a reference voltage generator, a register, and a clock generator. The setting circuit 1570 may generate, through the reference voltage generator, the reference voltages VREF1, VREF2, and VREF3, the upper limit voltages VH1, VH2, and VH3, and the lower limit voltages VL1, VL2, and VL3, and may adjust their values. The reference voltage generator may use a bandgap reference structure. The setting circuit 1570 may store, in a register, the cross regulation determination information Rbdry, the initial pulse width information G1_INI, G2_INI, and G3_INI of the output switch control signals, the initial pulse width information GN_INI for the ground switch control signal and the initial pulse width information GF_INI of the inductor switch control signal. The clock generator may generate the internal clock ICLK.

The setting circuit 1570 may change, through an externally applied clock CLK or a communication signal COM, the reference voltages VREF1, VREF2, and VREF3, the upper limit voltages VH1, VH2, and VH3, the lower limit voltages VL1, VL2, and VL3, the cross regulation determination information Rbdry, the initial pulse width information G1_INI, G2_INI, and G3_INI of the output switch control signals, the initial pulse width information GN_INI for the ground switch control signal, the initial pulse width information GF_INI of the inductor switch control signal. Instead of the internal clock ICLK generated by the clock generator, the setting circuit 1570 may set the external clock CLK as the internal clock ICLK. Even when the multi-outputs driven by the DC-DC converter 1000 are changed, the setting circuit 1570 enables the DC-DC converter 1000 to drive the multi-outputs.

Figure 11:
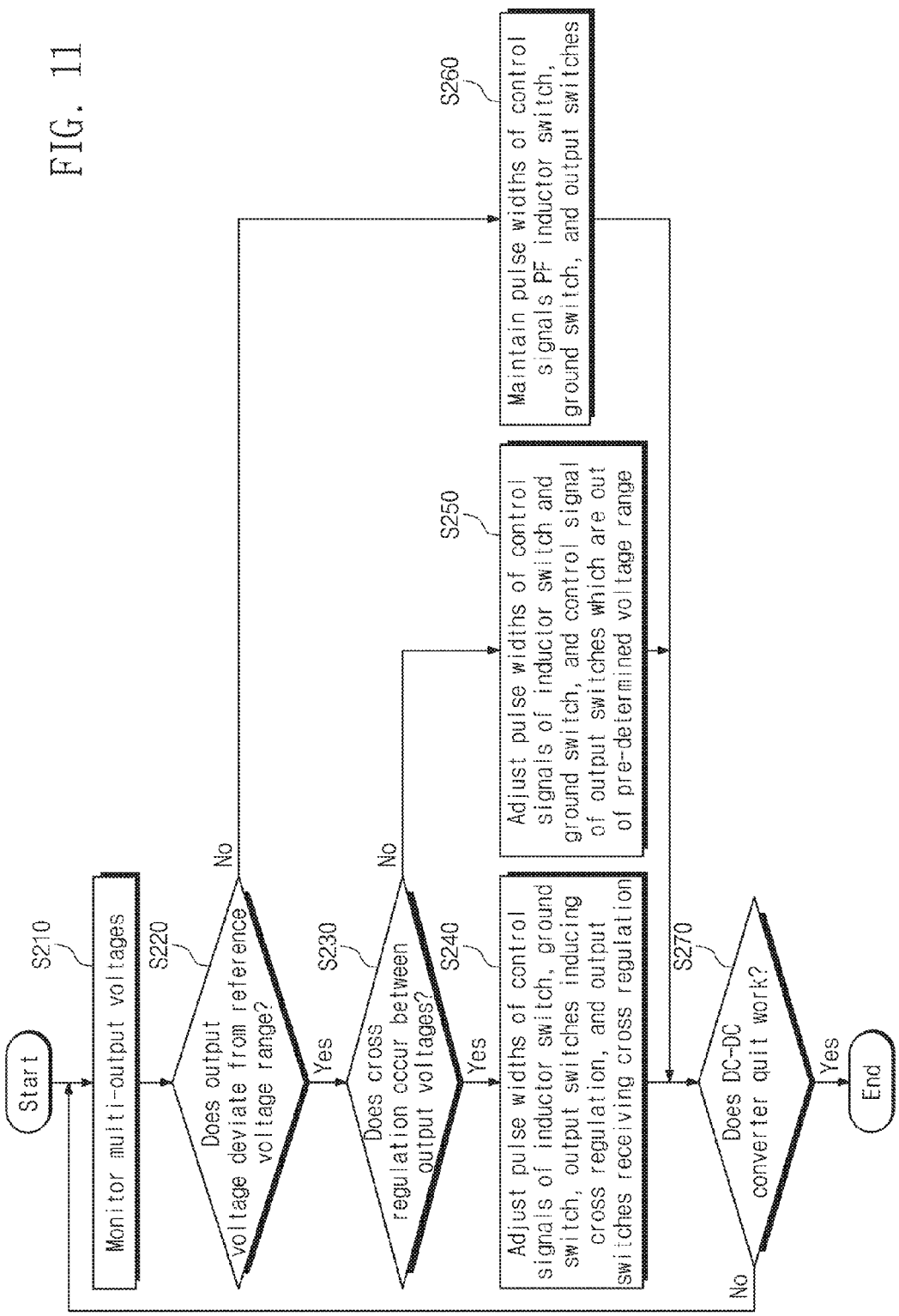
FIG. 11 is a flowchart showing an operating method of the DC-DC converter illustrated in FIG. 1.

FIG. 11 is a flowchart showing an operating method of the DC-DC converter illustrated in FIG. 1. Referring to FIG. 11, the DC-DC converter 1000 may drive each output such that each output voltage may be changed within a pre-determined voltage range.

In operation S210, the DC-DC converter 1000 may monitor voltages of the multi-outputs. To this end, the switch controller 1500 may receive multi-output voltages VO1, VO2, . . . , VOx. As described in relation to FIG. 4, the comparators 1511*a* and 1511*b* in the first hysteresis comparator 1510*a* may compare the first output voltage VO1 and the reference upper limit voltage, or the first output voltage VO1 and the reference lower limit voltage.

In operation S220, the DC-DC converter 1000 may determine whether each of the multi-output voltages is within a pre-determined voltage range. As described in relation to FIG. 3, the hysteresis comparators 1510*a*, 1510*b*, and 1510*c* may determine whether each output voltage deviates from a pre-determined voltage range.

In operation S230, since a part of or the entirety of multi-output voltages deviate from the pre-determined voltage range, the DC-DC converter 1000 may determine whether cross regulation occurs in the multi-outputs. As described in relation to FIG. 6A, the cross regulation determining circuit 1532 may determine whether cross regulation occurs by checking whether there is any one of the cross regulation determination signals D1, D2, and D3 having 2.

In operation S240, when a part of or the entirety of multi-outputs deviate from the pre-determined voltage range and cross regulation occurs between multi-output voltages, the DC-DC converter 1000 may change previous pulse widths of the indictor switch control signal GF, the ground switch control signal GN, the output switch control signals inducing cross regulation, and the output switch control signals receiving cross regulation. In operation S240, the pulse width information G1_REG, G2_REG, G3_REG, GN_REG, and GF_REG of the switch control signals of the pulse generator 1530b may be changed.

In operation S250, when a part of or the entirety of multi-outputs deviate from the pre-determined voltage range but cross regulation does not occur between multi-output voltages, the DC-DC converter 1000 may change previous pulse widths of the indictor switch control signal GF, the ground switch control signal GN, and the output switch control signals out of the pre-determined voltage range. In operation S250, the pulse width information G1_REG, G2_REG, G3_REG, GN_REG, and GF_REG of the switch control signals of the pulse generator 1530b may be changed.

In operation S260, since each of the multi-output voltages is within the pre-determined voltage range, the DC-DC converter 1000 may maintain previous pulse widths of the indictor switch control signal GF, the ground switch control signal GN, and the output switch control signals G1, . . . , and Gx. In operation S260, the pulse width information G1_REG, G2_REG, G3_REG, GN_REG, and GF_REG of the switch control signals of the pulse generator 1530b may be maintained constant.

In operation S270, it may be determined whether the operation of the DC-DC converter 1000 is stopped. When the operation of the DC-DC converter 1000 is stopped, the DC-DC converter 1000 may end driving of the multi-output voltages. When the operation of the DC-DC converter 1000 is not stopped, the DC-DC converter 1000 may perform the operations again from operation S210. Through this, the DC-DC converter 1000 may allow the multi-output voltages to be changed only within the pre-determined voltage range.

Figure 12:
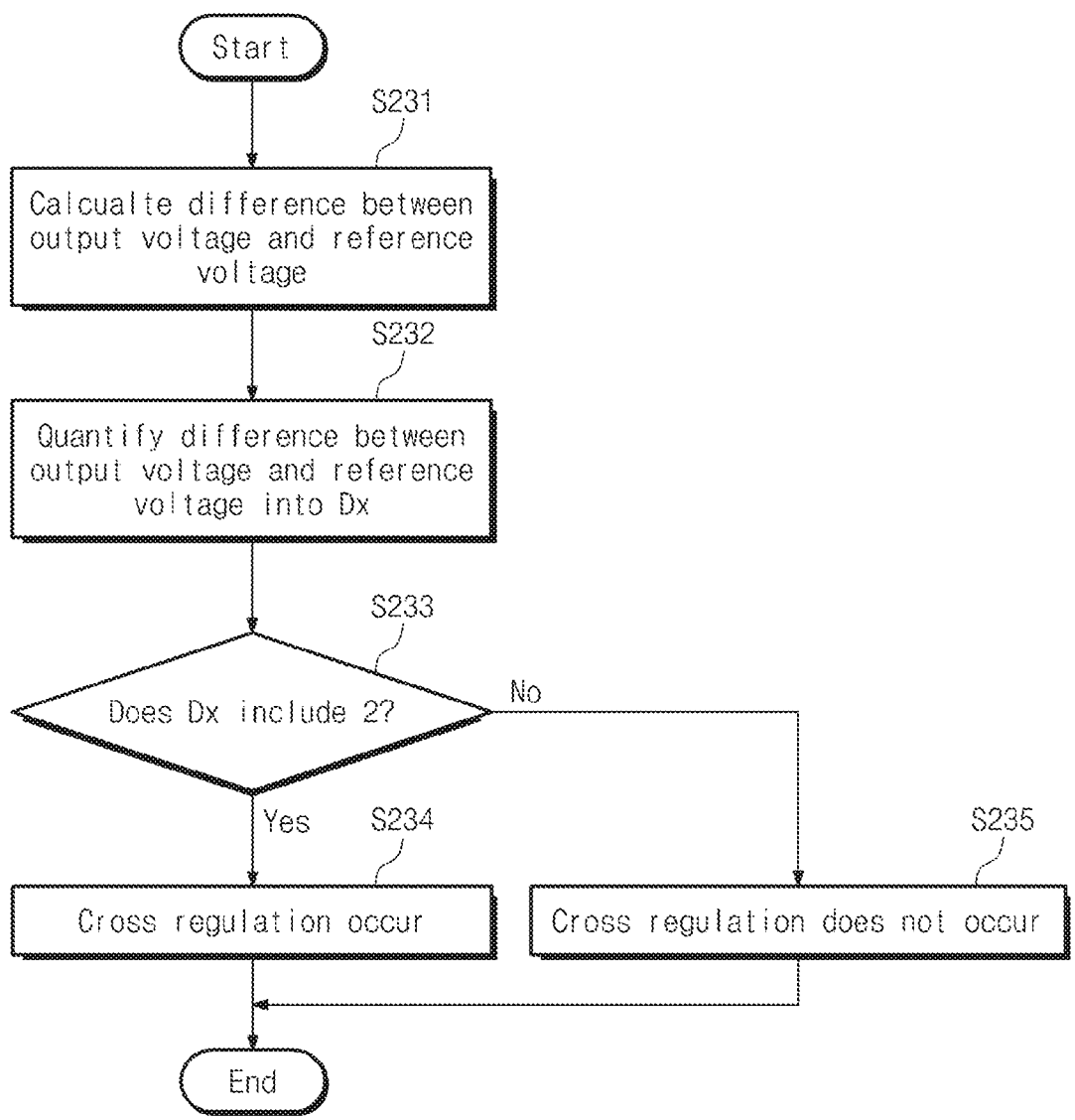
FIG. 12 is a flowchart illustrating in detail operation S230 of FIG. 11.

FIG. 12 is a flowchart illustrating in detail operation S230 illustrated in FIG. 11. Referring to FIG. 12, the DC-DC converter 1000 may digitize a difference between each output voltage and a reference voltage to determine whether cross regulation occurs between multi-output voltages.

In operation S231, the DC-DC converter 1000 may calculate the difference between each output voltage and the reference voltage. As described in relation to FIG. 6A, the output voltage monitors 1531a, 1531b, and 1531c may perform an operation corresponding to Equation (1) to generate median values M1, M2, and M3.

In operation S232, the DC-DC converter 1000 may digitize the difference between each output voltage and the reference voltage into cross regulation determination signals D1, D2, . . . , Dx. As described in relation to FIG. 6A, the output voltage monitors 1531a, 1531b, and 1531c may perform an operation corresponding to Equation (2) to generate the cross regulation determination signals D1, D2, and D3.

In operation S233, the DC-DC converter 1000 may check whether there is any one of the cross regulation determination signals D1, D2, . . . , Dx having 2 to determine whether cross regulation occurs.

In operation S234, when there is any one of the cross regulation determination signals D1, D2, . . . , Dx having 2, the DC-DC converter 1000 may determine that cross regulation occurs between the multi-output voltages.

In operation S235, when there is not any one of the cross regulation determination signals D1, D2, . . . , Dx having 2, the DC-DC converter 1000 may not determine that cross regulation occurs between the multi-output voltages.

Figure 13A:
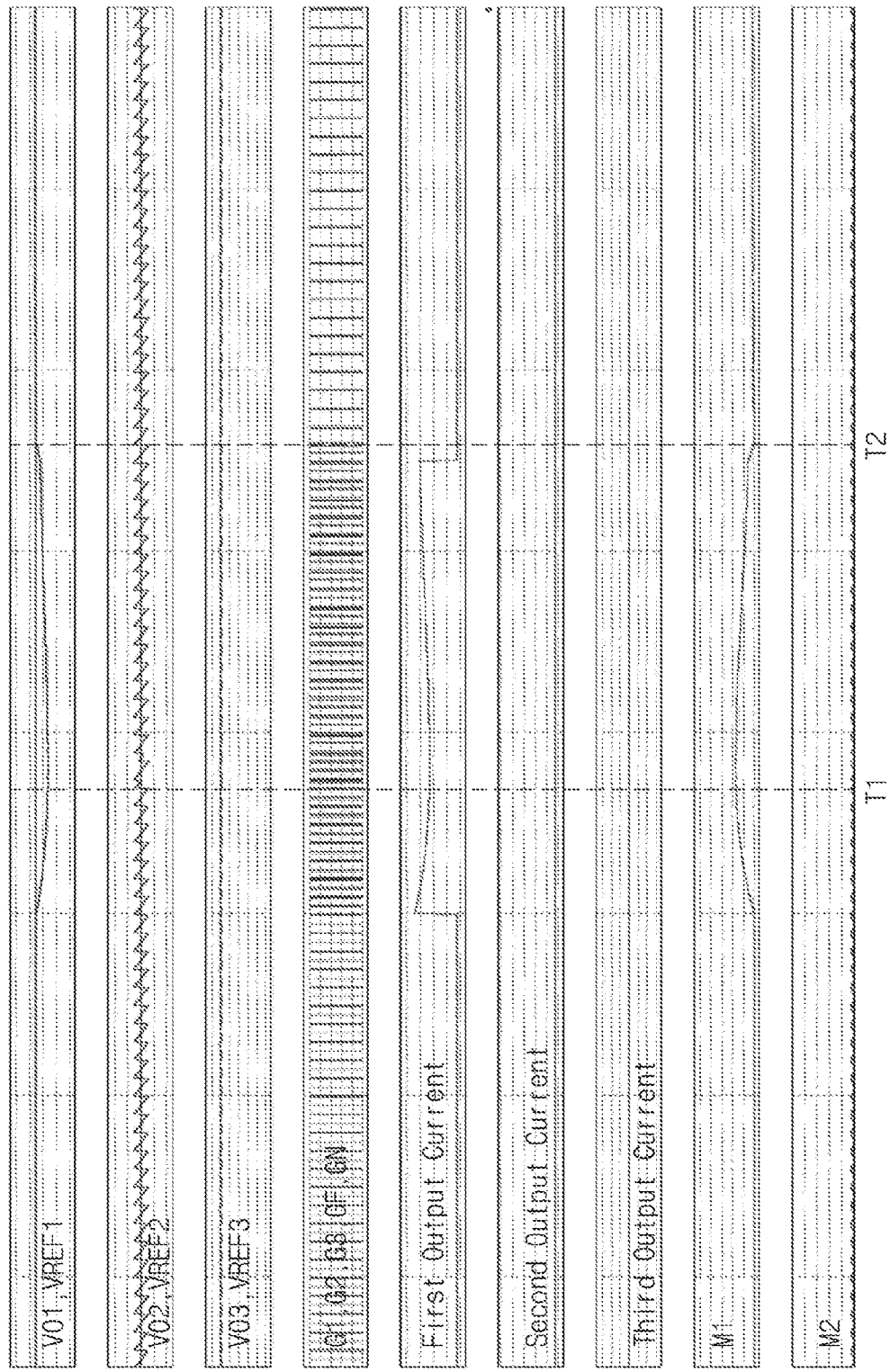
FIGS. 13A and 13B are timing diagrams exemplarily showing an operation of the DC-DC converter illustrated in FIG. 1.
Figure 13B:
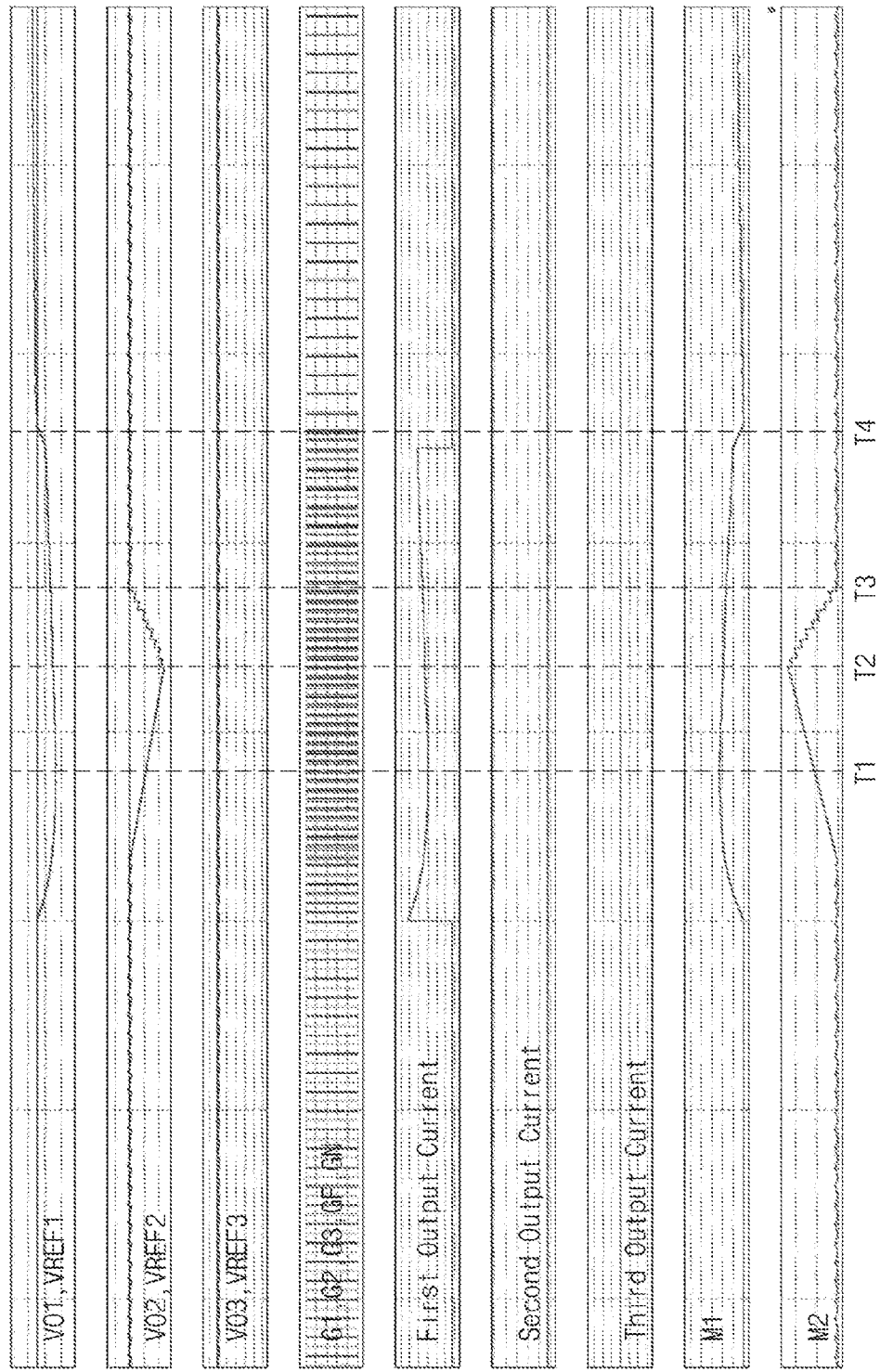

FIGS. 13A and 13B are timing diagrams exemplarily showing an operation of the DC-DC converter illustrated in FIG. 1. Referring to FIG. 13A, due to an increase in the first output voltage IO1, the first output voltage VO1 deviates from the pre-determined voltage range, and the remaining output voltages vary within the pre-determined voltage range. In this case, the DC-DC converter 1000 may confirm that cross regulation does not occur in the remaining outputs except for the first output and may drive the first output voltage VO1.

At time T1, the first output voltage VO1 may increase a median value M1 according to the increase in the first output current IO1. Since this is the case where cross regulation does not occur in the remaining outputs, the median value M2 may be maintained smaller than 1. At time T2, due to the operation of the DC-DC converter 1000, the first output voltage VO1 may vary within the pre-determined voltage range.

Referring to FIG. 13B, due to the increase in the first output voltage IO1, the first output voltage VO1 deviates from the pre-determined voltage range, and the second output voltage VO2 also deviates from the pre-determined voltage range. In this case, the DC-DC converter 1000 may confirm that cross regulation occurs in the second output and may drive the first and second output voltages VO1 and VO2.

At time T1, the first output voltage VO1 may increase the median value M1 according to the increase in the first output current IO1. At time T2, the second output voltage VO2 may increase a median value M2 according to the cross regulation with the first output. At time T3, due to the operation of the DC-DC converter 1000, the second output voltage VO2 may vary within the pre-determined voltage range. At time T4, due to the operation of the DC-DC converter 1000, the first output voltage VO1 may vary within the pre-determined voltage range.

A DC-DC converter according to embodiments of the present disclosure may measure to reduce cross regulation between output voltages.

On the other hand, the foregoing description is about specific embodiments for practicing the present invention. The present invention encompasses the technical spirit of abstract and conceptual idea that may be used as a future technology as well as specific and actually useable means.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A DC-DC converter comprising:
an inductor configured to store input energy;
a ground switch configured to provide a ground path of the inductor in response to a first signal;
an inductor switch connected in parallel to the inductor so as to maintain the energy stored in the inductor in response to a second signal;
output switches configured to output the energy stored in the inductor as multi-output voltages in response to third signals; and
a switch controller configured to determine cross regulation between the multi-outputs and generate the first to third signals for decreasing the cross regulation, the switch controller including
a voltage rise time controller configured to control a rise time of the multi-output voltages,
a pulse generator configured to determine whether multi-output voltages require a voltage rise and generate pulse signals, and to control the turn-on or turn-off time of the ground switch and the inductor switch,
a plurality of output switch controllers corresponding to the output switches, each output switch controller being configured to generate one of the third signals to turn on or off the corresponding output switch using outputs of the voltage rise time controller and the pulse signals of the pulse generator when one of the multi-output voltages corresponding thereto deviates from a predetermined voltage range,
a plurality of hysteresis comparators configured to correspond to the multi-outputs and to compare the multi-output voltages respectively with a plurality of reference voltages, to thereby generate a plurality of hysteresis outputs and output the hysteresis outputs to the voltage rise time controller,
a ground switch controller configured to generate the first signal using the outputs of the voltage rise time controller and the results of the pulse generator, to thereby control the ground switch,
an inductor switch controller configured to receive the hysteresis outputs and to thereby control the inductor switch, and
a setting circuit configured to set initial pulse width information of a control signal of the ground switch, initial pulse width information of a control signal of the inductor switch, initial pulse width information of control signals of the output switches, variable voltage information of the multi-output voltages in comparison to the reference voltages, cross regulation information between the outputs, or a clock used by the switch controller.

2. The DC-DC converter of claim 1, wherein the setting circuit sets the initial pulse width information of a control signal of the ground switch, the initial pulse width information of a control signal of the inductor switch, the initial pulse width information of control signals of the output switches, the voltage information, the cross regulation information, or the clock in response to an external clock and a communication signal.

3. The DC-DC converter of claim 1, wherein at least one of the hysteresis comparators comprises:
a first comparator configured to compare any one of the multi-output voltages with a maximum of a variable voltage;
a second comparator configured to compare any one of the multi-output voltages with a minimum of the variable voltage;
a first delay circuit configured to delay an output of the first comparator;
a second delay circuit configured to delay an output of the second comparator;
a first inverter configured to invert an output of the first delay circuit;
a second inverter configured to invert an output of the second delay circuit;
a first logic circuit configured to receive the output of the first comparator and an output of the first inverter to perform a logical AND operation on the received outputs;
a second logic circuit configured to receive the output of the second comparator and an output of the second inverter to perform logical AND operation on the received outputs; and
a SR latch configured to receive outputs of the first and second logic circuits.

4. The DC-DC converter of claim 3, wherein the first or second delay circuit comprises an even number of inverters.

5. The DC-DC converter of claim 1, wherein the pulse generator comprises:
output voltage monitors configured to correspond to the multi-outputs and to monitor any one of the multi-output voltages;
a cross regulation determining circuit configured to receive results of the output voltage monitors to determine cross regulation between the multi-output voltages;
registers for output switches configured to correspond to the multi-outputs and to store information about the output switch control signals;
a register for inductor switch configured to store information about the inductor switch control signal;
a register for ground switch configured to store information about the ground switch control signal;
at least one logic circuit for output switches configured to correspond to the multi-outputs and to receive results of the registers for output switch and a result of the cross regulation determining circuit to generate information about the output switch control signals;
a logic circuit for ground switch configured to receive a result of the register for ground switch, the result of cross regulation determining circuit, or results of the logic circuits for output switch corresponding to the multi-outputs to generate information about the ground switch control signal;
a logic circuit for inductor switch configured to receive a result of the register for inductor switch, the result of cross regulation determining circuit, a result of the logic circuit for ground switch, or results of logic circuits for output switches to generate information about the inductor switch control signal;
a counter configured to count the clock; and
a comparator configured to compare a result of the counter and the results of the logic circuits.

6. The DC-DC converter of claim 5, wherein each of the output voltage monitors calculates an absolute value of a difference between the output voltage and the reference voltage and digitizes how much the absolute value deviates from a pre-determined voltage range.

7. The DC-DC converter of claim 5, wherein the cross regulation determining circuit determines whether any of the results of the output voltage monitors is equal to 2.

8. The DC-DC converter of claim 1, wherein the ground switch controller comprises:
a first circuit configured to generate the first signal when any one of the multi-output voltages deviates from a pre-determined voltage range;
a second circuit configured to generate the first signal when a plurality of voltages of the multi-output voltages deviate from the pre-determined voltage range; and
a third circuit configured to generate the first signal when all the multi-output voltages deviate from the pre-determined voltage range.

9. The DC-DC converter of claim 1, wherein the inductor switch controller generates the second signal for turning on the inductor switch using outputs of the hysteresis comparators when all the multi-output voltages are within a pre-determined voltage range.

10. An operation method of a DC-DC converter, the operation method comprising:
monitoring multi-output voltages;
determining whether the multi-output voltages deviate from a pre-determined voltage range;
determining whether cross regulation occurs between the multi-output voltages when the multi-output voltages deviate from the pre-determined voltage range; and
controlling pulse widths of control signals of an inductor switch, a ground switch, output switches inducing cross regulation, and output switches receiving cross regulation, when the cross regulation occurs, including
controlling a rise time of the multi-output voltages using a voltage rise time controller,
determining whether multi-output voltages require a voltage rise and generating pulse signals using a pulse generator,
generating an output switch control signal to turn on or off one of output switches using outputs of the voltage rise time controller and the pulse signals of the pulse generator when one of the multi-output voltages corresponding thereto deviates from the predetermined voltage range,
controlling turn-on or turn-off time of the ground switch and the inductor switch,
comparing the multi-output voltages respectively with a plurality of reference voltages, to thereby generate a plurality of hysteresis outputs and output the hysteresis outputs to the voltage rise time controller,
generating a first signal using the outputs of the voltage rise time controller and the results of the pulse generator, to thereby control the ground switch,
receiving the hysteresis outputs to thereby control the inductor switch, and
setting initial pulse width information of a control signal of the ground switch, initial pulse width information of a control signal of the inductor switch, initial pulse width information of control signals of the output switches, variable voltage information of the multi-output voltages in comparison to the reference voltages, cross regulation information between the outputs, or a clock used by the switch controller.

11. The operation method of claim 10, further comprising:
controlling the pulse widths of the control signals of the inductor switch and the ground switch, and control signals of the output switches, which deviate from the pre-determined voltage range, when the multi-output voltages are out of the pre-determined voltage range and the cross regulation does not occur.

12. The operation method of claim 10, further comprising:
maintaining the pulse widths of the control signals of the inductor switch, the ground switch, and the output switches when the multi-output voltages are within the pre-determined voltage range.

13. The operation method of claim 10, wherein the determining of whether the cross regulation occurs comprises:
calculating a difference between any one of the multi-output voltages and a reference voltage;
digitizing how much the difference deviates from the pre-determined voltage range;
determining whether any of the digitized results is equal to 2; and
determining that the cross regulation occurs when any of the digitized results is equal to 2.

14. The operation method of claim 13, wherein when none of the digitized results is equal to 2, it is determined that the cross regulation does not occur.

* * * * *